US012763827B2

(12) United States Patent
Whinnett et al.

(10) Patent No.: US 12,763,827 B2
(45) Date of Patent: Oct. 13, 2026

(54) BEAMFORMING FOR MULTIPLE-INPUT MULTIPLE-OUTPUT (MIMO) MODES IN OPEN RADIO ACCESS NETWORK (O-RAN) SYSTEMS

(71) Applicant: Intel Products IP LLC, Santa Clara, CA (US)

(72) Inventors: Nicholas Whinnett, Bath and North East Somerset (GB); Dawei Ying, Hillsboro, OR (US); Bishwarup Mondal, San Ramon, CA (US); Jan Schreck, San Jose, CA (US); Jaemin Han, Portland, OR (US); Leifeng Ruan, Beijing (CN); Jianli Sun, Beaverton, OR (US)

(73) Assignee: Intel Products IP LLC, Santa Clara, CA (US)

( * ) Notice: Subject to any disclaimer, the term of this patent is extended or adjusted under 35 U.S.C. 154(b) by 302 days.

(21) Appl. No.: 18/550,398

(22) PCT Filed: Jul. 12, 2022

(86) PCT No.: PCT/US2022/036850
§ 371 (c)(1),
(2) Date: Sep. 13, 2023

(87) PCT Pub. No.: WO2023/287808
PCT Pub. Date: Jan. 19, 2023

(65) Prior Publication Data

US 2024/0162955 A1 May 16, 2024

Related U.S. Application Data

(60) Provisional application No. 63/276,916, filed on Nov. 8, 2021, provisional application No. 63/221,379, filed on Jul. 13, 2021.

(51) Int. Cl.
*H04B 7/06* (2006.01)
*H04B 7/0452* (2017.01)

(52) U.S. Cl.
CPC ......... *H04B 7/0617* (2013.01); *H04B 7/0452* (2013.01); *H04B 7/063* (2013.01); *H04B 7/0632* (2013.01)

(58) Field of Classification Search
CPC .... H04B 7/0617; H04B 7/0452; H04B 7/063; H04B 7/0632; H04W 24/10; H04W 24/02; H04W 88/085; G06N 20/00
See application file for complete search history.

(56) References Cited

U.S. PATENT DOCUMENTS

2016/0345343 A1* 11/2016 Elsherif ............... H04B 7/0689
2020/0287639 A1 9/2020 Su et al.
(Continued)

FOREIGN PATENT DOCUMENTS

WO 2020/171803 A1 8/2020
WO WO-2020181533 A1 * 9/2020 ........... H04B 7/0634

OTHER PUBLICATIONS

O-RAN Alliance, O-RAN Working Group 1 Use Cases Detailed Specification, version 4.0 (Year: 2021).*
(Continued)

*Primary Examiner* — Moo Jeong
*Assistant Examiner* — David Zhijun Sun
(74) *Attorney, Agent, or Firm* — Schwegman Lundberg & Woessner, P.A.

(57) ABSTRACT

Various embodiments herein are directed to beamforming associated with multiple-input multiple-output (MIMO) modes in open radio access network (O-RAN) systems. In one embodiment, an apparatus comprises: memory to store beamforming configuration information associated with a plurality MIMO modes; and processing circuitry, coupled
(Continued)

with the memory to: retrieve the beamforming configuration information from the memory; request, based on the beamforming configuration information, measurements associated with the plurality of MIMO modes; receive the measurements associated with the plurality of MIMO modes; and based on the received measurements, train an artificial intelligence/machine learning (AI/ML) model that is to predict relative beamforming performance between the plurality of MIMO modes.

12 Claims, 12 Drawing Sheets

(56) References Cited

U.S. PATENT DOCUMENTS

| | | | | |
|---|---|---|---|---|
| 2020/0395995 | A1* | 12/2020 | Eriksson | H04B 7/0619 |
| 2021/0212046 | A1 | 7/2021 | Sharma et al. | |
| 2022/0167188 | A1* | 5/2022 | Soulhi | G06N 10/60 |
| 2022/0278717 | A1* | 9/2022 | Tsui | H04B 7/0634 |
| 2024/0422587 | A1* | 12/2024 | Wang | H04W 48/18 |

OTHER PUBLICATIONS

International Patent Office—International Search Report and Written Opinion mailed Oct. 26, 2022, from International Patent Application No. PCT/US2022/036850, 13 pages.

Ferrus, et al., "Applicability Domains of Machine Learning in Next Generation Radio Access Networks," IEEE Xplore, DOI: 10.1109/CSCI49370.2019.00203, 2019 International Conference on Computational Science and Computational Intelligence (CSCI), Dec. 5-7, 2019, 9 pages.

O-RAN, "O-RAN Working Group 1 Use Cases Analysis Report ," O-RAN.WG1.Use-Cases-Analysis-Report-v04.00, 2021 by O-RAN Alliance e.V., Alfter, Germany, 49 pages.

O-RAN, "O-RN Working Group 1 Use Cases Detailed Specification," O-RAN.WG1.Use-Cases-Detailed-Specification-v04.00, 2021 by O-RAN Alliance e.V., Alfter, Germany, 90 pages.

* cited by examiner

BEAMFORMING FOR MULTIPLE-INPUT MULTIPLE-OUTPUT (MIMO) MODES IN OPEN RADIO ACCESS NETWORK (O-RAN) SYSTEMS

CROSS REFERENCE TO RELATED APPLICATION

The present application is a national phase entry under 35 U.S.C. § 371 of International Application No. PCT/US2022/036850, filed Jul. 12, 2022, entitled "BEAMFORMING FOR MULTIPLE-INPUT MULTIPLE-OUTPUT (MIMO) MODES IN OPEN RADIO ACCESS NETWORK (O-RAN) SYSTEMS," which claims priority to U.S. Provisional Patent Application No. 63/221,379, which was filed Jul. 13, 2021; and to U.S. Provisional Patent Application No. 63/276,916, which was filed Nov. 8, 2021, the entire disclosures of which are hereby incorporated by reference.

FIELD

Various embodiments generally may relate to the field of wireless communications. For example, some embodiments may relate to beamforming associated with multiple-input multiple-output (MIMO) modes in open radio access network (O-RAN) systems.

BACKGROUND

The Open Radio Access Network (O-RAN) architecture includes the concept of a RAN Intelligent Controller (RIC) which, amongst other things, is envisioned to support non-real time (non-RT) or near-real time (near-RT) configuration/optimization of lower-level MAC or L1 functionality residing in the Distributed Unit (DU). The non-RT or near-RT RIC control loops operate at the slower period than typically used for MAC/L1 (which operate on timescales of slots or faster).

One aspect of O-RAN relates to beamforming for Massive MIMO (mMIMO), which is a key feature of 5G networks for the enhancement of range, throughput and capacity. The beamforming approaches may be optimized according to local conditions in a cell such as local propagation, traffic and interference conditions. O-RAN is putting in place support for AI/ML-based optimization for mMIMO/beamforming whereby an rApp located in a non-real-time RIC or xApp located in the near real-time RIC may adjust beamforming-related parameters. This has so far considered the so-called "Grid of Beams" (GoB) based beamforming approach, where a candidate set of beams is defined at each cell, and UEs are assigned to beams, with beam acquisition/tracking/failure procedures defined for their management. Embodiments of the present disclosure address these and other issues.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1A:
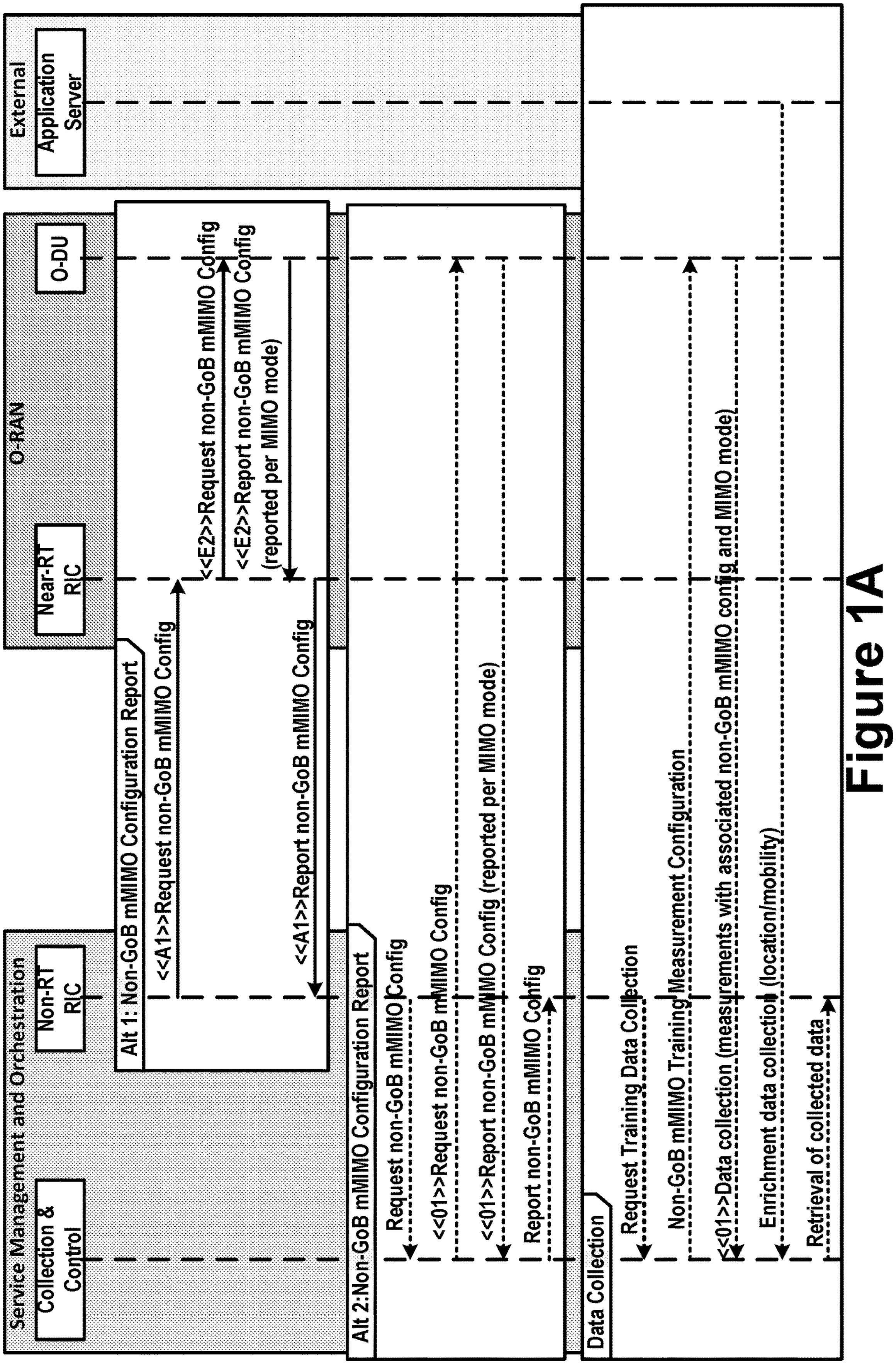
FIGS. 1A and 1B illustrates an example of a configuration Report, AI/ML training and deployment in accordance with various embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrases "A or B" and "A/B" mean (A), (B), or (A and B).

As introduced above, conventional systems have utilized the GoB-based beamforming approach, where a candidate set of beams is defined at each cell, and UEs are assigned to beams, with beam acquisition/tracking/failure procedures defined for their management. However, non-GoB beamforming approaches are also being implemented for 5G, especially for lower sub-6 GHz frequency bands, for example the Sounding Reference Symbol (SRS) based approaches which rely on uplink/downlink correspondence, where uplink and downlink beams are computed "on the fly" based on channel measurements made using SRS, rather than selecting from a set of predefined beams. The Intel 5G FlexRAN solution is one example where SRS-based non-GoB beamforming is used. O-RAN is only just starting to consider AI/ML-assisted enhancements for such non-GoB beamforming. SRS based beamforming is particularly attractive for massive MIMO arrays because quite accurate channel state information can be obtained at the gNB with very little overhead in the DL or UL channels.

It should be noted that non-GoB algorithms are not standardized, but instead are vendor-specific proprietary algorithms. In addition, multiple algorithm modes or options may be implemented, where some modes may be more suited to particular conditions of the wireless channel or to particular 3GPP configuration options such as SRS periodicity. Examples of beamforming modes include, but are not limited to: different SRS channel estimation algorithms (for example time domain, frequency domain); different weight calculation approaches (for example matched filter, Eigen, Zero-forcing beamforming); and different time or frequency granularity.

Another important aspect relates to MIMO modes. MIMO transmissions may be made to/from a single UE (Single User or SU-MIMO), or UEs may be grouped such that MIMO transmissions may be made to/from multiple UEs (Multiple User or MU-MIMO). Examples of SU-MIMO modes are where 2 or 4 layers are sent simultaneously to/from a single UE. An example MU-MIMO mode is where there are 4 UEs in a MIMO group, each sending or receiving 2 layers, so MIMO using 8 layers in total. The preferred aforementioned beamforming mode may depend on MIMO mode. For MU-MIMO, the choice of beamforming mode may take into account the characteristics of all UEs in the MU-MIMO group.

Various embodiments herein provide techniques for a third party controller (such as RIC) to learn about vendor-specific beamforming modes implemented in a gNB/O-DU and provide control over such modes, including in the case where multiple MIMO modes can be used.

Prior techniques included AI/ML-assisted optimizations for GoB-based beamforming for example as defined in use cases for 0-RAN. However, these techniques do not apply to control of proprietary vendor-specific beamforming modes.

Additionally, prior techniques include SRS-based beamforming approaches without AI/ML enhancements. However, SRS-based beamforming for mMIMO may incur significant computational overhead. Prediction of a suitable operation mode that balances complexity and performance is valuable.

In accordance with various embodiments herein, the RIC requests the beamforming configuration from gNB/O-DU, which responds with abstracted information. The abstracted information may be as simple as the number of modes supported (=N). Optionally, there could be additional information provided, such as the circumstances in which use of each of the N modes is considered (by the gNB/O-DU) to be suitable (for example low/high mobility, low/high SNR). There may be multiple sets of abstracted information, one per MIMO mode. The RIC initiates a training phase where measurements (such as SINR reports, and achieved throughput reports) are obtained for each of the N modes, and together with enrichment information (such as information relating to location and/or mobility), this allows RIC to train AI/ML models which aim to predict the relative performance between the modes, or simply the best mode. This may be done for multiple MIMO modes. After the training phase, prediction takes place using the trained models and additional measurements, and a recommendation or control command of which mode to use (out of the N modes) is provided from RIC to gNB/O-DU. One beamforming mode recommendation/control command may be provided per MIMO mode and per UE. The scheduler in gNB/O-DU may consider the beamforming mode recommendations/commands for multiple UEs when deciding which UEs to group together for MU-MIMO, for example by grouping UEs together having the same beamforming mode recommendation/control command.

Embodiments provided herein may enable control of proprietary vendor-specific beamforming features by 3rd party controllers over open O-RAN interfaces, without the need to describe proprietary features.

Aspects of various embodiments may be included in further versions of O-RAN specifications (e.g., Use Case Requirements descriptions, A1 interface specification, O1/O2 interface specification, E2 interface specification).

An example is described which assumes the O-RAN architecture and interfaces. It is assumed that Non-RT RIC is responsible for obtaining beamforming configuration information from the gNB/O-DU, model training, and model deployment to near-RT RIC, which performs model inference and control of gNB/O-DU.

Figure 1B:
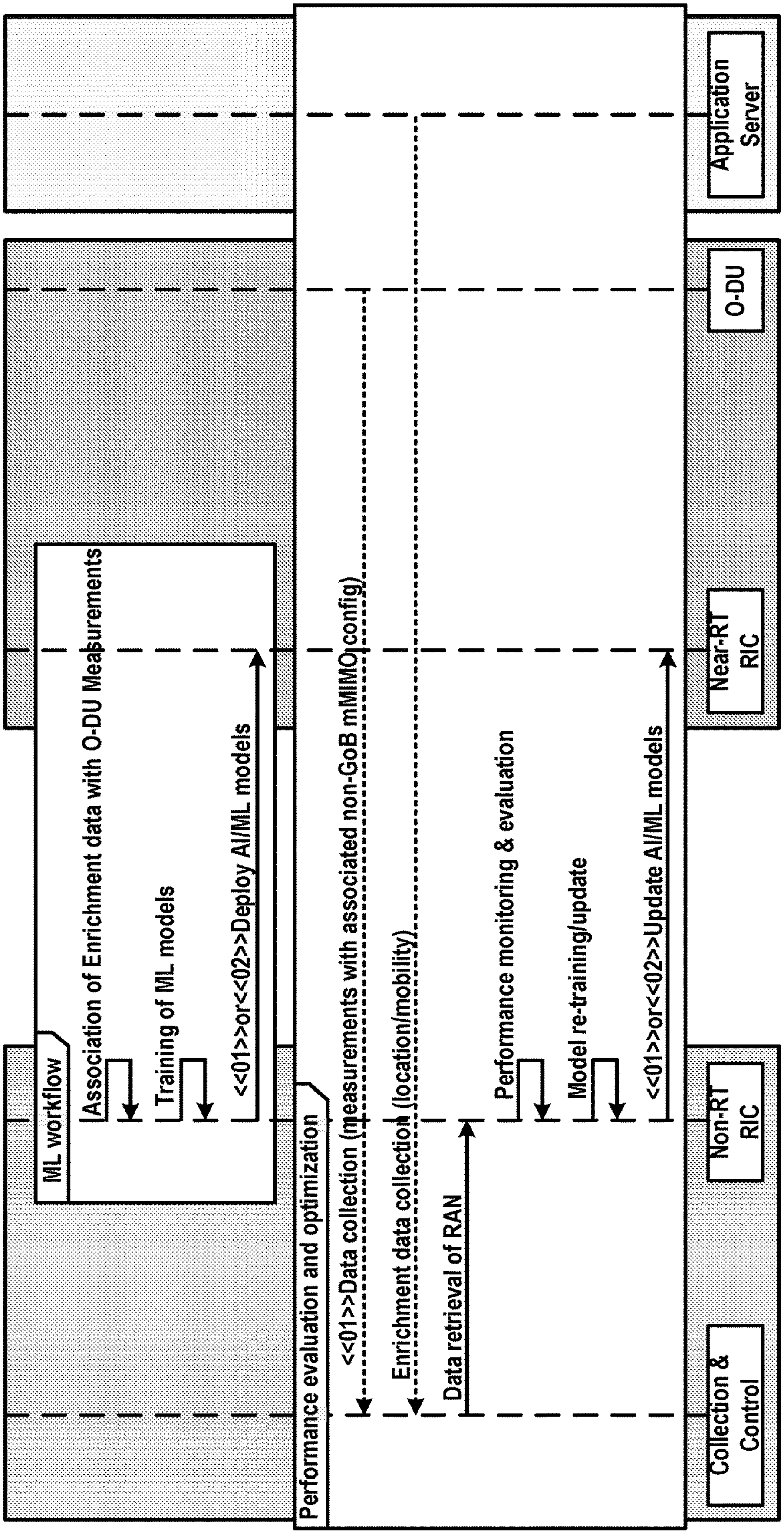

Referring to FIGS. 1A and 1B, the non-RT RIC requests the beamforming configuration (referred to as "non-GoB mMIMO Config" in the diagram), and O-DU provides the requested report (for the N modes as discussed above). A set of modes may be defined separately for each of multiple MIMO modes, as indicated by the "reported per MIMO mode" labels in FIG. 1A. Two alternatives are considered, one using the A1 and E2 interfaces (via near RT-RIC), and one via a "Collection and Control" function and O-DU, using O1. Which option to use will be determined during the O-RAN specification phase.

As mentioned above, the N modes may be supplemented with information such as that shown in the table below. The computational complexity allows gNB power and processing resource load management aspects to be additionally considered by the non-RT RIC.

| Mode ID | UL/DL | SNR range (low/med/high) | UE Mobility (stationary/low/high) | Computational complexity (low/med/high) |
|---|---|---|---|---|
| 0 | | | | |
| 1 | | | | |
| 2 | | | | |
| . | | | | |
| . | | | | |
| . | | | | |
| N-1 | | | | |

Figure 2:
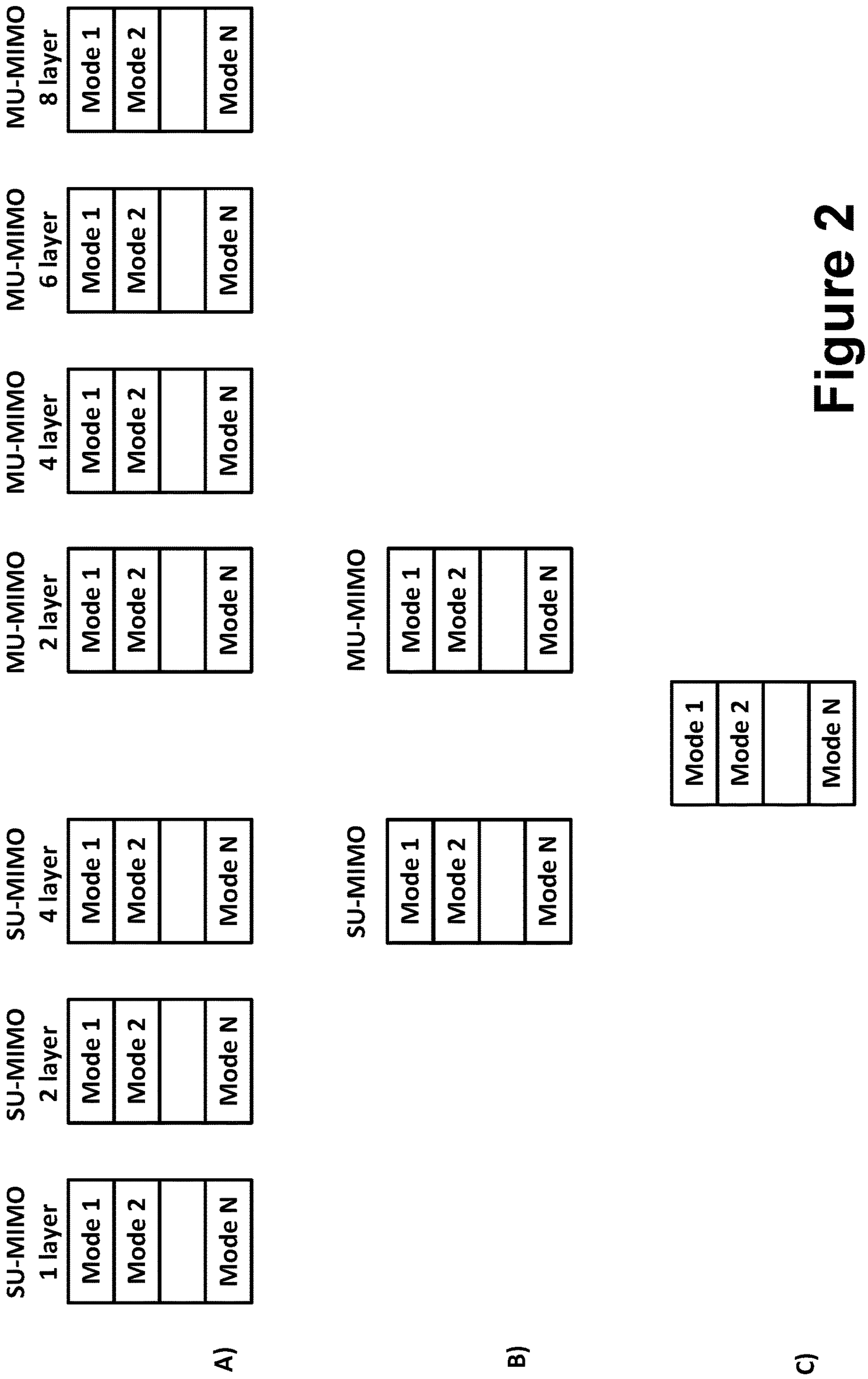
FIG. 2 illustrates and example of beamforming mode definitions versus MIMO modes in accordance with various embodiments.

Three possible examples of how this reporting per MIMO mode can be done are illustrated in FIG. 2 as follows:

- A set of modes for each number of layers for MU-MIMO, plus a set of modes for each combination of #layers for SU-MIMO, for example FIG. 2 (A).
- One set of modes for SU-MIMO and one set of modes for MU-MIMO, for example FIG. 2 (B).
- A single set of modes (FIG. 2 (C)). In this case it is assumed that the same set of modes is applicable to SU-MIMO and MU-MIMO, irrespective of the number of layers, number of MU-MIMO UEs, etc.

For each set of modes, these may follow a known order in terms of robustness, for example for 3 modes:

- mode 0 could be a scheme based on SRS with little averaging of channel estimates (best performing with good SRS channel estimates, least robust to estimation errors)
- mode 1 could be a scheme based on SRS with more averaging of channel estimates (more robust, but can be suboptimal if channel estimate quality is high)
- mode 2 could be a Grid-of-Beams (codebook) approach which does not rely on SRS uplink channel measurements (most robust, but most degradation in cases of high quality uplink channels).

Referring back to FIG. 1A, the Data Collection phase is entered, where non-RT RIC requests data collection from O-DU via a "Collection and Control" function, using O1. The O-DU responds with measurements over O1, such as SINR, some or all of the measurements being associated with each of the N beamforming modes (labeled "associated non-GoB mMIMO config" in the diagram). The measurements, such as throughput measurements, may also be tagged with MU-MIMO-related identifiers to define the MIMO mode. These identifiers could be a MU-MIMO UE group ID (such that all UEs in the same group are assigned the same ID), or it could be a list of other UEs in the MU-MIMO group, or it could be simply an indication that the UE was part of a MU-MIMO group for the period of the throughput measurement. During the data collection phase, enrichment information from outside the O-DU, such as information related to UE location, may also be collected.

Referring now to FIG. 1B, in the ML workflow phase the non-RT RIC trains AI/ML model(s) which will be used to predict relative performance between the N modes (or simply to predict the best mode), and deploys the trained models to the near-RT RIC (e.g., over O1 or O2—to be determined by O-RAN). This may be done for each set of modes corresponding to different MIMO configurations, for each UE.

Finally, in the Performance evaluation and optimization phase, models may be re-trained and re-deployed based on updated measurements sent between O-DU and non-RT RIC (via the "Collection and Control" entity) and on updated enrichment information.

Figure 3:
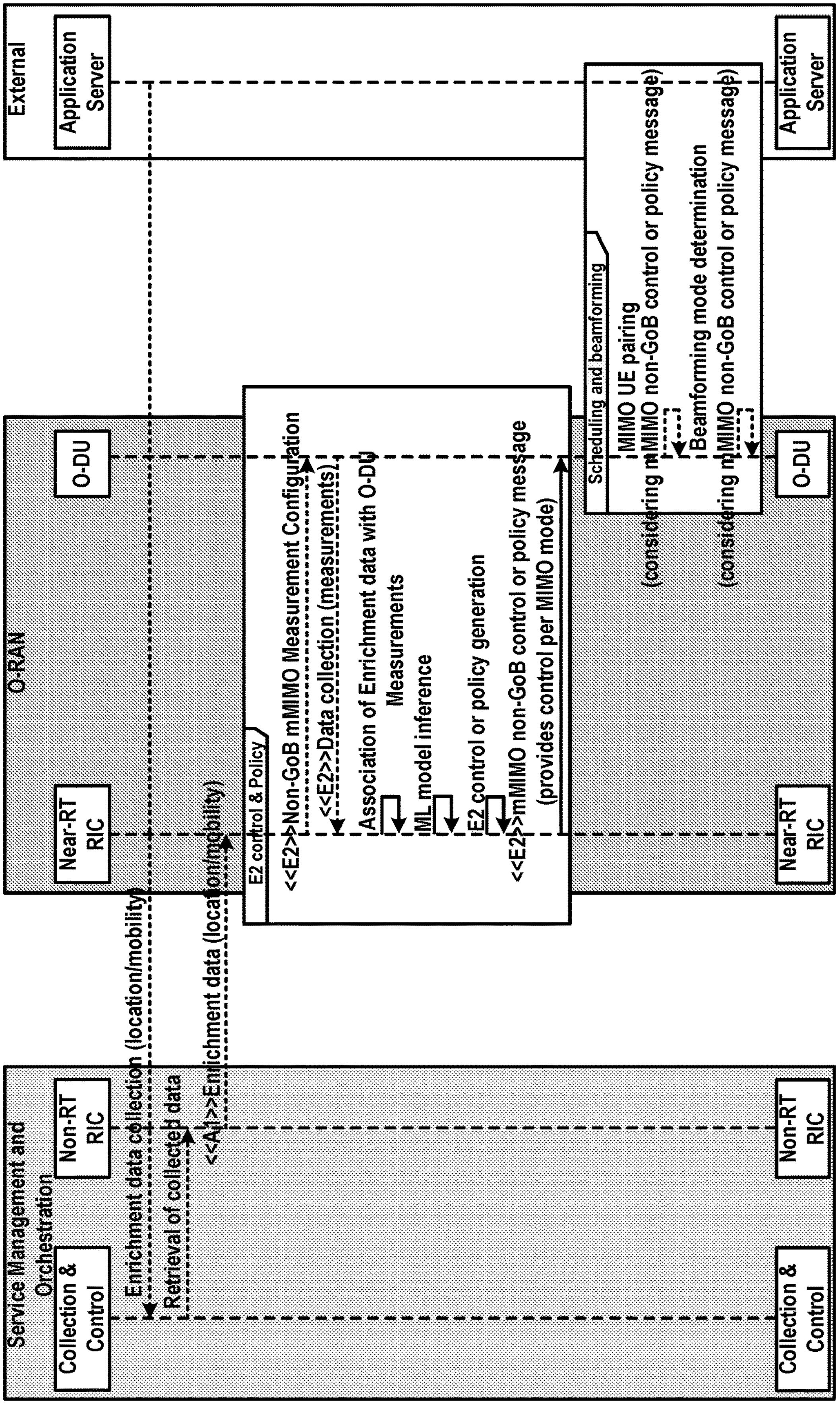
FIG. 3 illustrates an example of AI/ML Inference in accordance with various embodiments.

Referring to FIG. 3, the near-RT RIC performs AI/ML model inference using models previously deployed from the non-RT RIC. Enrichment information is provided from non-RT RIC via A1, and measurements (such as SINR) obtained from O-DU over E2. The recommended/configured beamforming mode (out of N) is provided from near-RT to O-DU over E2 ("mMIMO non-GoB control or policy message" in FIG. 3). This may be done for each set of MIMO modes as defined above as shown by the "provides control per MIMO mode" label in FIG. 3. Furthermore, the scheduler may make use of this information to improve its beamforming mode selection as well as how it decides on pairing of UEs for MU-MIMO (as illustrated in FIG. 3 within the "Scheduling and beamforming" block). Specifically, the scheduler may select MU-MIMO UEs for paring who have the same recommended/configured mode for the particular MU-MIMO configuration. Or, in case it does not select UEs having the same recommended/configured beamforming mode, it may instead select the most robust out of the per-selected UE modes to use for beamforming.

Optionally, the beamforming mode recommendation/configuration may be selected by the near-RT RIC in order to improve the training data set, which could be used, for example, in the case of reinforcement learning based implementations.

Systems and Implementations

FIGS. 4-8 illustrate various systems, devices, and components that may implement aspects of disclosed embodiments.

Figure 4:
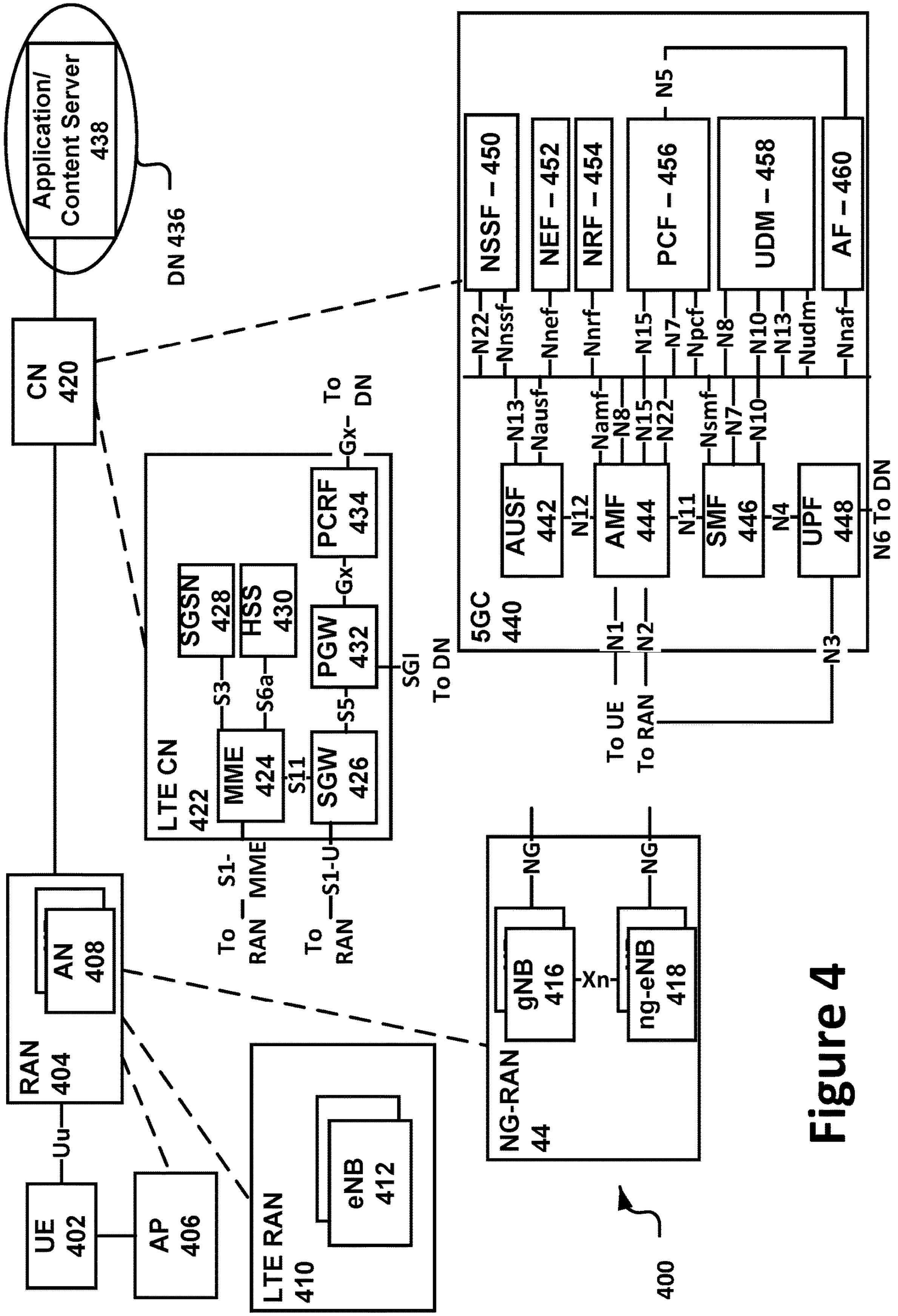
FIG. 4 schematically illustrates a wireless network in accordance with various embodiments.

FIG. 4 illustrates a network 400 in accordance with various embodiments. The network 400 may operate in a manner consistent with 3GPP technical specifications for LTE or 5G/NR systems. However, the example embodiments are not limited in this regard and the described embodiments may apply to other networks that benefit from the principles described herein, such as future 3GPP systems, or the like.

The network 400 may include a UE 402, which may include any mobile or non-mobile computing device designed to communicate with a RAN 404 via an over-the-air connection. The UE 402 may be communicatively coupled with the RAN 404 by a Uu interface. The UE 402 may be, but is not limited to, a smartphone, tablet computer, wearable computer device, desktop computer, laptop computer, in-vehicle infotainment, in-car entertainment device, instrument cluster, head-up display device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, M2M or D2D device, IoT device, etc.

In some embodiments, the network 400 may include a plurality of UEs coupled directly with one another via a sidelink interface. The UEs may be M2M/D2D devices that communicate using physical sidelink channels such as, but not limited to, PSBCH, PSDCH, PSSCH, PSCCH, PSFCH, etc.

In some embodiments, the UE 402 may additionally communicate with an AP 406 via an over-the-air connection. The AP 406 may manage a WLAN connection, which may serve to offload some/all network traffic from the RAN 404. The connection between the UE 402 and the AP 406 may be consistent with any IEEE 802.11 protocol, wherein the AP 406 could be a wireless fidelity (Wi-Fi®) router. In some embodiments, the UE 402, RAN 404, and AP 406 may utilize cellular-WLAN aggregation (for example, LWA/LWIP). Cellular-WLAN aggregation may involve the UE 402 being configured by the RAN 404 to utilize both cellular radio resources and WLAN resources.

The RAN 404 may include one or more access nodes, for example, AN 408. AN 408 may terminate air-interface protocols for the UE 402 by providing access stratum protocols including RRC, PDCP, RLC, MAC, and L1 protocols. In this manner, the AN 408 may enable data/voice connectivity between CN 420 and the UE 402. In some embodiments, the AN 408 may be implemented in a discrete device or as one or more software entities running on server computers as part of, for example, a virtual network, which may be referred to as a CRAN or virtual baseband unit pool. The AN 408 be referred to as a BS, gNB, RAN node, eNB, ng-eNB, NodeB, RSU, TRxP, TRP, etc. The AN 408 may be a macrocell base station or a low power base station for providing femtocells, picocells or other like cells having smaller coverage areas, smaller user capacity, or higher bandwidth compared to macrocells.

In embodiments in which the RAN 404 includes a plurality of ANs, they may be coupled with one another via an X2 interface (if the RAN 404 is an LTE RAN) or an Xn interface (if the RAN 404 is a 5G RAN). The X2/Xn interfaces, which may be separated into control/user plane interfaces in some embodiments, may allow the ANs to communicate information related to handovers, data/context transfers, mobility, load management, interference coordination, etc.

The ANs of the RAN 404 may each manage one or more cells, cell groups, component carriers, etc. to provide the UE 402 with an air interface for network access. The UE 402 may be simultaneously connected with a plurality of cells provided by the same or different ANs of the RAN 404. For example, the UE 402 and RAN 404 may use carrier aggregation to allow the UE 402 to connect with a plurality of component carriers, each corresponding to a Pcell or Scell. In dual connectivity scenarios, a first AN may be a master node that provides an MCG and a second AN may be secondary node that provides an SCG. The first/second ANs may be any combination of eNB, gNB, ng-eNB, etc.

The RAN 404 may provide the air interface over a licensed spectrum or an unlicensed spectrum. To operate in the unlicensed spectrum, the nodes may use LAA, eLAA, and/or feLAA mechanisms based on CA technology with PCells/Scells. Prior to accessing the unlicensed spectrum, the nodes may perform medium/carrier-sensing operations based on, for example, a listen-before-talk (LBT) protocol.

In V2X scenarios the UE 402 or AN 408 may be or act as a RSU, which may refer to any transportation infrastructure entity used for V2X communications. An RSU may be implemented in or by a suitable AN or a stationary (or relatively stationary) UE. An RSU implemented in or by: a UE may be referred to as a "UE-type RSU"; an eNB may be referred to as an "eNB-type RSU"; a gNB may be referred to as a "gNB-type RSU"; and the like. In one example, an RSU is a computing device coupled with radio frequency circuitry located on a roadside that provides connectivity support to passing vehicle UEs. The RSU may also include internal data storage circuitry to store intersection map geometry, traffic statistics, media, as well as applications/software to sense and control ongoing vehicular and pedestrian traffic. The RSU may provide very low latency communications required for high speed events, such as crash avoidance, traffic warnings, and the like. Additionally or alternatively, the RSU may provide other cellular/WLAN communications services. The components of the RSU may be packaged in a weatherproof enclosure suitable for outdoor installation, and may include a network interface controller to provide a wired connection (e.g., Ethernet) to a traffic signal controller or a backhaul network.

In some embodiments, the RAN 404 may be an LTE RAN 410 with eNBs, for example, eNB 412. The LTE RAN 410 may provide an LTE air interface with the following characteristics: SCS of 15 kHz; CP-OFDM waveform for DL and SC-FDMA waveform for UL; turbo codes for data and TBCC for control; etc. The LTE air interface may rely on CSI-RS for CSI acquisition and beam management; PDSCH/PDCCH DMRS for PDSCH/PDCCH demodulation; and CRS for cell search and initial acquisition, channel quality measurements, and channel estimation for coherent demodulation/detection at the UE. The LTE air interface may operating on sub-6 GHz bands.

In some embodiments, the RAN 404 may be an NG-RAN 414 with gNBs, for example, gNB 416, or ng-eNBs, for example, ng-eNB 418. The gNB 416 may connect with 5G-enabled UEs using a 5G NR interface. The gNB 416 may connect with a 5G core through an NG interface, which may include an N2 interface or an N3 interface. The ng-eNB 418 may also connect with the 5G core through an NG interface, but may connect with a UE via an LTE air interface. The gNB 416 and the ng-eNB 418 may connect with each other over an Xn interface.

In some embodiments, the NG interface may be split into two parts, an NG user plane (NG-U) interface, which carries traffic data between the nodes of the NG-RAN 414 and a UPF 448 (e.g., N3 interface), and an NG control plane (NG-C) interface, which is a signaling interface between the nodes of the NG-RAN 414 and an AMF 444 (e.g., N2 interface).

The NG-RAN 414 may provide a 5G-NR air interface with the following characteristics: variable SCS; CP-OFDM for DL, CP-OFDM and DFT-s-OFDM for UL; polar, repetition, simplex, and Reed-Muller codes for control and LDPC for data. The 5G-NR air interface may rely on CSI-RS, PDSCH/PDCCH DMRS similar to the LTE air interface. The 5G-NR air interface may not use a CRS, but may use PBCH DMRS for PBCH demodulation; PTRS for phase tracking for PDSCH; and tracking reference signal for time tracking. The 5G-NR air interface may operating on FR1 bands that include sub-6 GHz bands or FR2 bands that include bands from 24.25 GHz to 52.6 GHz. The 5G-NR air interface may include an SSB that is an area of a downlink resource grid that includes PSS/SSS/PBCH.

In some embodiments, the 5G-NR air interface may utilize BWPs for various purposes. For example, BWP can be used for dynamic adaptation of the SCS. For example, the UE 402 can be configured with multiple BWPs where each BWP configuration has a different SCS. When a BWP change is indicated to the UE 402, the SCS of the transmission is changed as well. Another use case example of BWP is related to power saving. In particular, multiple BWPs can be configured for the UE 402 with different amount of frequency resources (for example, PRBs) to support data transmission under different traffic loading scenarios. A BWP containing a smaller number of PRBs can be used for data transmission with small traffic load while allowing power saving at the UE 402 and in some cases at the gNB 416. A BWP containing a larger number of PRBs can be used for scenarios with higher traffic load.

The RAN 404 is communicatively coupled to CN 420 that includes network elements to provide various functions to support data and telecommunications services to customers/subscribers (for example, users of UE 402). The components of the CN 420 may be implemented in one physical node or separate physical nodes. In some embodiments, NFV may be utilized to virtualize any or all of the functions provided by the network elements of the CN 420 onto physical compute/storage resources in servers, switches, etc. A logical instantiation of the CN 420 may be referred to as a network slice, and a logical instantiation of a portion of the CN 420 may be referred to as a network sub-slice.

In some embodiments, the CN 420 may be an LTE CN 422, which may also be referred to as an EPC. The LTE CN 422 may include MME 424, SGW 426, SGSN 428, HSS 430, PGW 432, and PCRF 434 coupled with one another over interfaces (or "reference points") as shown. Functions of the elements of the LTE CN 422 may be briefly introduced as follows.

The MME 424 may implement mobility management functions to track a current location of the UE 402 to facilitate paging, bearer activation/deactivation, handovers, gateway selection, authentication, etc.

The SGW 426 may terminate an S1 interface toward the RAN and route data packets between the RAN and the LTE CN 422. The SGW 426 may be a local mobility anchor point for inter-RAN node handovers and also may provide an anchor for inter-3GPP mobility. Other responsibilities may include lawful intercept, charging, and some policy enforcement.

The SGSN 428 may track a location of the UE 402 and perform security functions and access control. In addition, the SGSN 428 may perform inter-EPC node signaling for mobility between different RAT networks; PDN and S-GW selection as specified by MME 424; MME selection for handovers; etc. The S3 reference point between the MME 424 and the SGSN 428 may enable user and bearer information exchange for inter-3GPP access network mobility in idle/active states.

The HSS 430 may include a database for network users, including subscription-related information to support the network entities' handling of communication sessions. The HSS 430 can provide support for routing/roaming, authentication, authorization, naming/addressing resolution, location dependencies, etc. An S6*a* reference point between the HSS 430 and the MME 424 may enable transfer of subscription and authentication data for authenticating/authorizing user access to the LTE CN 420.

The PGW 432 may terminate an SGi interface toward a data network (DN) 436 that may include an application/content server 438. The PGW 432 may route data packets between the LTE CN 422 and the data network 436. The PGW 432 may be coupled with the SGW 426 by an S5 reference point to facilitate user plane tunneling and tunnel management. The PGW 432 may further include a node for policy enforcement and charging data collection (for example, PCEF). Additionally, the SGi reference point between the PGW 432 and the data network 4 36 may be an operator external public, a private PDN, or an intra-operator packet data network, for example, for provision of IMS services. The PGW 432 may be coupled with a PCRF 434 via a Gx reference point.

The PCRF 434 is the policy and charging control element of the LTE CN 422. The PCRF 434 may be communicatively coupled to the app/content server 438 to determine appropriate QoS and charging parameters for service flows. The PCRF 432 may provision associated rules into a PCEF (via Gx reference point) with appropriate TFT and QCI.

In some embodiments, the CN 420 may be a 5GC 440. The 5GC 440 may include an AUSF 442, AMF 444, SMF 446, UPF 448, NSSF 450, NEF 452, NRF 454, PCF 456, UDM 458, and AF 460 coupled with one another over interfaces (or "reference points") as shown. Functions of the elements of the 5GC 440 may be briefly introduced as follows.

The AUSF 442 may store data for authentication of UE 402 and handle authentication-related functionality. The AUSF 442 may facilitate a common authentication framework for various access types. In addition to communicating with other elements of the 5GC 440 over reference points as shown, the AUSF 442 may exhibit an Nausf service-based interface.

The AMF 444 may allow other functions of the 5GC 440 to communicate with the UE 402 and the RAN 404 and to subscribe to notifications about mobility events with respect to the UE 402. The AMF 444 may be responsible for registration management (for example, for registering UE 402), connection management, reachability management, mobility management, lawful interception of AMF-related events, and access authentication and authorization. The AMF 444 may provide transport for SM messages between the UE 402 and the SMF 446, and act as a transparent proxy for routing SM messages. AMF 444 may also provide transport for SMS messages between UE 402 and an SMSF. AMF 444 may interact with the AUSF 442 and the UE 402 to perform various security anchor and context management functions. Furthermore, AMF 444 may be a termination point of a RAN CP interface, which may include or be an N2 reference point between the RAN 404 and the AMF 444; and the AMF 444 may be a termination point of NAS (N1) signaling, and perform NAS ciphering and integrity protection. AMF 444 may also support NAS signaling with the UE 402 over an N3 IWF interface.

The SMF 446 may be responsible for SM (for example, session establishment, tunnel management between UPF 448 and AN 408); UE IP address allocation and management (including optional authorization); selection and control of UP function; configuring traffic steering at UPF 448 to route traffic to proper destination; termination of interfaces toward policy control functions; controlling part of policy enforcement, charging, and QoS; lawful intercept (for SM events and interface to LI system); termination of SM parts of NAS messages; downlink data notification; initiating AN specific SM information, sent via AMF 444 over N2 to AN 408; and determining SSC mode of a session. SM may refer to management of a PDU session, and a PDU session or "session" may refer to a PDU connectivity service that provides or enables the exchange of PDUs between the UE 402 and the data network 436.

The UPF 448 may act as an anchor point for intra-RAT and inter-RAT mobility, an external PDU session point of interconnect to data network 436, and a branching point to support multi-homed PDU session. The UPF 448 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform uplink traffic verification (e.g., SDF-to-QoS flow mapping), transport level packet marking in the uplink and downlink, and perform downlink packet buffering and downlink data notification triggering. UPF 448 may include an uplink classifier to support routing traffic flows to a data network.

The NSSF 450 may select a set of network slice instances serving the UE 402. The NSSF 450 may also determine allowed NSSAI and the mapping to the subscribed S-NSSAIs, if needed. The NSSF 450 may also determine the AMF set to be used to serve the UE 402, or a list of candidate AMFs based on a suitable configuration and possibly by querying the NRF 454. The selection of a set of network slice instances for the UE 402 may be triggered by the AMF 444 with which the UE 402 is registered by interacting with the NS SF 450, which may lead to a change of AMF. The NSSF 450 may interact with the AMF 444 via an N22 reference point; and may communicate with another NSSF in a visited network via an N31 reference point (not shown). Additionally, the NSSF 450 may exhibit an Nnssf service-based interface.

The NEF 452 may securely expose services and capabilities provided by 3GPP network functions for third party, internal exposure/re-exposure, AFs (e.g., AF 460), edge computing or fog computing systems, etc. In such embodiments, the NEF 452 may authenticate, authorize, or throttle the AFs. NEF 452 may also translate information exchanged with the AF 460 and information exchanged with internal network functions. For example, the NEF 452 may translate between an AF-Service-Identifier and an internal 5GC information. NEF 452 may also receive information from other NFs based on exposed capabilities of other NFs. This information may be stored at the NEF 452 as structured data, or at a data storage NF using standardized interfaces. The stored information can then be re-exposed by the NEF 452 to other NFs and AFs, or used for other purposes such as analytics. Additionally, the NEF 452 may exhibit an Nnef service-based interface.

The NRF 454 may support service discovery functions, receive NF discovery requests from NF instances, and provide the information of the discovered NF instances to the NF instances. NRF 454 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 454 may exhibit the Nnrf service-based interface.

The PCF 456 may provide policy rules to control plane functions to enforce them, and may also support unified policy framework to govern network behavior. The PCF 456 may also implement a front end to access subscription information relevant for policy decisions in a UDR of the UDM 458. In addition to communicating with functions over reference points as shown, the PCF 456 exhibit an Npcf service-based interface.

The UDM 458 may handle subscription-related information to support the network entities' handling of communication sessions, and may store subscription data of UE 402. For example, subscription data may be communicated via an N8 reference point between the UDM 458 and the AMF 444. The UDM 458 may include two parts, an application front end and a UDR. The UDR may store subscription data and policy data for the UDM 458 and the PCF 456, and/or structured data for exposure and application data (including PFDs for application detection, application request information for multiple UEs 402) for the NEF 452. The Nudr service-based interface may be exhibited by the UDR 221 to allow the UDM 458, PCF 456, and NEF 452 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 458 may exhibit the Nudm service-based interface.

The AF 460 may provide application influence on traffic routing, provide access to NEF, and interact with the policy framework for policy control.

In some embodiments, the 5GC 440 may enable edge computing by selecting operator/3$^{rd}$ party services to be geographically close to a point that the UE 402 is attached to the network. This may reduce latency and load on the network. To provide edge-computing implementations, the 5GC 440 may select a UPF 448 close to the UE 402 and execute traffic steering from the UPF 448 to data network 436 via the N6 interface. This may be based on the UE subscription data, UE location, and information provided by the AF 460. In this way, the AF 460 may influence UPF (re)selection and traffic routing. Based on operator deployment, when AF 460 is considered to be a trusted entity, the network operator may permit AF 460 to interact directly with relevant NFs. Additionally, the AF 460 may exhibit an Naf service-based interface.

The data network 436 may represent various network operator services, Internet access, or third party services that may be provided by one or more servers including, for example, application/content server 438.

Figure 5:
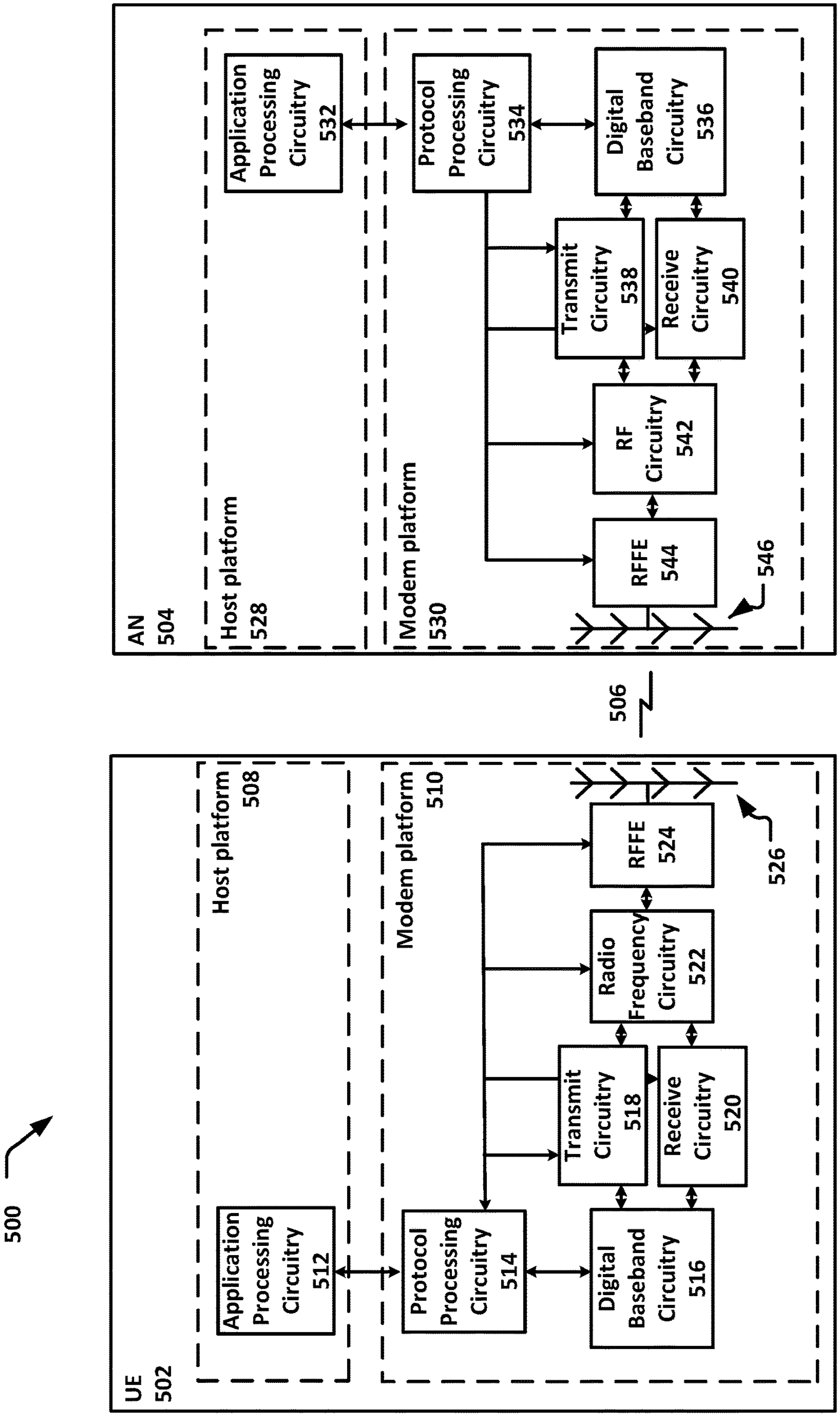
FIG. 5 schematically illustrates components of a wireless network in accordance with various embodiments.

FIG. 5 schematically illustrates a wireless network 500 in accordance with various embodiments. The wireless network 500 may include a UE 502 in wireless communication with an AN 504. The UE 502 and AN 504 may be similar to, and substantially interchangeable with, like-named components described elsewhere herein.

The UE 502 may be communicatively coupled with the AN 504 via connection 506. The connection 506 is illustrated as an air interface to enable communicative coupling, and can be consistent with cellular communications protocols such as an LTE protocol or a 5G NR protocol operating at mmWave or sub-6 GHz frequencies.

The UE 502 may include a host platform 508 coupled with a modem platform 510. The host platform 508 may include application processing circuitry 512, which may be coupled with protocol processing circuitry 514 of the modem platform 510. The application processing circuitry 512 may run various applications for the UE 502 that source/sink application data. The application processing circuitry 512 may further implement one or more layer operations to transmit/receive application data to/from a data network. These layer operations may include transport (for example UDP) and Internet (for example, IP) operations The protocol processing circuitry 514 may implement one or more of layer operations to facilitate transmission or reception of data over the connection 506. The layer operations implemented by the protocol processing circuitry 514 may include, for example, MAC, RLC, PDCP, RRC and NAS operations.

The modem platform 510 may further include digital baseband circuitry 516 that may implement one or more layer operations that are "below" layer operations performed by the protocol processing circuitry 514 in a network protocol stack. These operations may include, for example, PHY operations including one or more of HARQ-ACK functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 510 may further include transmit circuitry 518, receive circuitry 520, RF circuitry 522, and RF front end (RFFE) 524, which may include or connect to one or more antenna panels 526. Briefly, the transmit circuitry 518 may include a digital-to-analog converter, mixer, intermediate frequency (IF) components, etc.; the receive circuitry 520 may include an analog-to-digital converter, mixer, IF components, etc.; the RF circuitry 522 may include a low-noise amplifier, a power amplifier, power tracking components, etc.; RFFE 524 may include filters (for example, surface/bulk acoustic wave filters), switches, antenna tuners, beamforming components (for example, phase-array antenna components), etc. The selection and arrangement of the components of the transmit circuitry 518, receive circuitry 520, RF circuitry 522, RFFE 524, and antenna panels 526 (referred generically as "transmit/receive components") may be specific to details of a specific implementation such as, for example, whether communication is TDM or FDM, in mmWave or sub-6 gHz frequencies, etc. In some embodiments, the transmit/receive components may be arranged in multiple parallel transmit/receive chains, may be disposed in the same or different chips/modules, etc.

In some embodiments, the protocol processing circuitry 514 may include one or more instances of control circuitry (not shown) to provide control functions for the transmit/receive components.

A UE reception may be established by and via the antenna panels 526, RFFE 524, RF circuitry 522, receive circuitry 520, digital baseband circuitry 516, and protocol processing circuitry 514. In some embodiments, the antenna panels 526 may receive a transmission from the AN 504 by receive-beamforming signals received by a plurality of antennas/antenna elements of the one or more antenna panels 526.

A UE transmission may be established by and via the protocol processing circuitry 514, digital baseband circuitry 516, transmit circuitry 518, RF circuitry 522, RFFE 524, and antenna panels 526. In some embodiments, the transmit components of the UE 504 may apply a spatial filter to the data to be transmitted to form a transmit beam emitted by the antenna elements of the antenna panels 526.

Similar to the UE 502, the AN 504 may include a host platform 528 coupled with a modem platform 530. The host platform 528 may include application processing circuitry 532 coupled with protocol processing circuitry 534 of the modem platform 530. The modem platform may further include digital baseband circuitry 536, transmit circuitry 538, receive circuitry 540, RF circuitry 542, RFFE circuitry 544, and antenna panels 546. The components of the AN 504 may be similar to and substantially interchangeable with like-named components of the UE 502. In addition to performing data transmission/reception as described above, the components of the AN 508 may perform various logical functions that include, for example, RNC functions such as radio bearer management, uplink and downlink dynamic radio resource management, and data packet scheduling.

Figure 6:
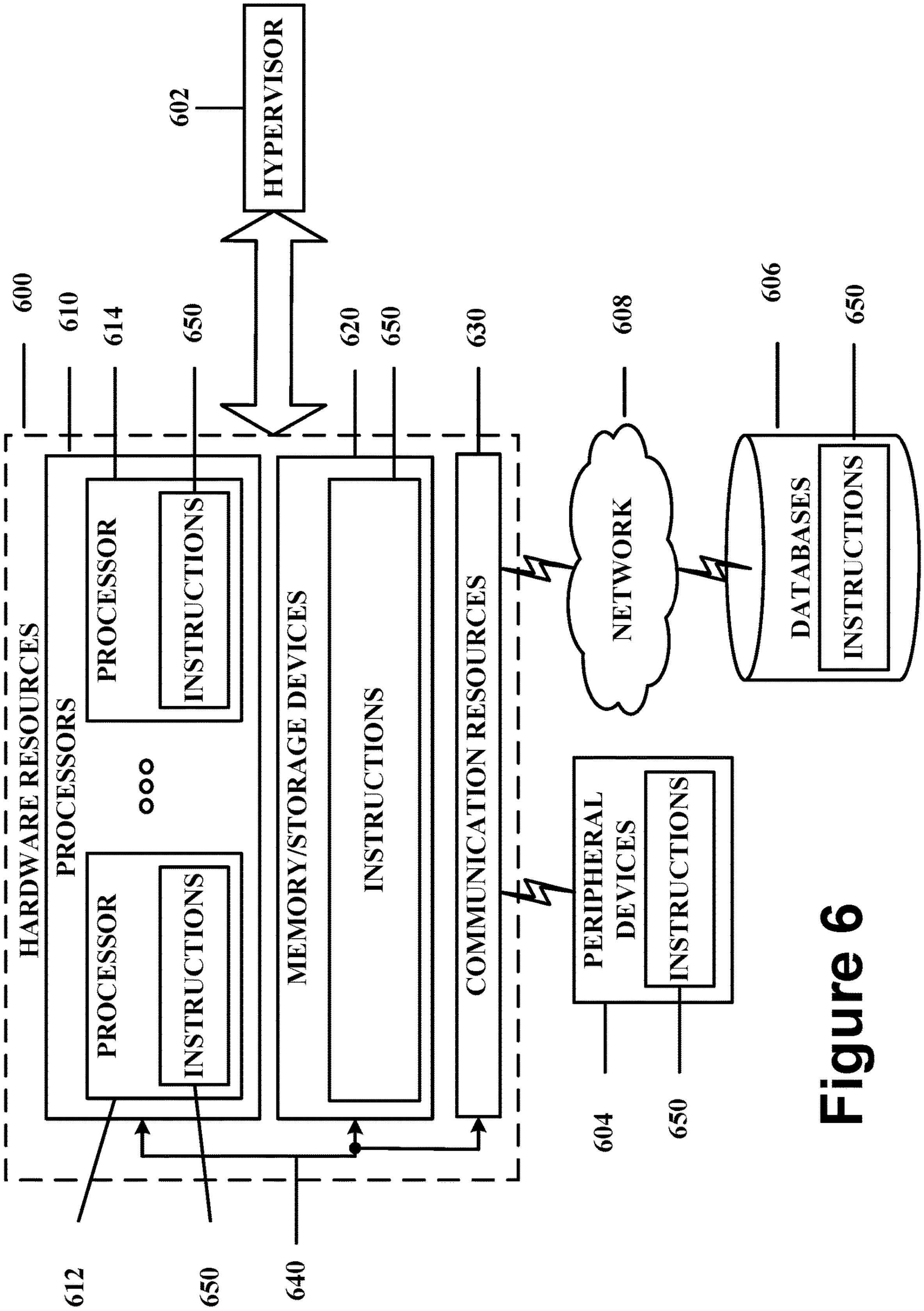
FIG. 6 is a block diagram illustrating components, according to some example embodiments, able to read instructions from a machine-readable or computer-readable medium (e.g., a non-transitory machine-readable storage medium) and perform any one or more of the methodologies discussed herein.

FIG. 6 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 6 shows a diagrammatic representation of hardware resources 600 including one or more processors (or processor cores) 610, one or more memory/storage devices 620, and one or more communication resources 630, each of which may be communicatively coupled via a bus 640 or other interface circuitry. For embodiments where node virtualization (e.g., NFV) is utilized, a hypervisor 602 may be executed to provide an execution environment for one or more network slices/sub-slices to utilize the hardware resources 600.

The processors 610 may include, for example, a processor 612 and a processor 614. The processors 610 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 620 may include main memory, disk storage, or any suitable combination thereof. The memory/storage devices 620 may include, but are not limited to, any type of volatile, non-volatile, or semi-volatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 630 may include interconnection or network interface controllers, components, or other suitable devices to communicate with one or more peripheral devices 604 or one or more databases 606 or other network elements via a network 608. For example, the communication resources 630 may include wired communication components (e.g., for coupling via USB, Ethernet, etc.), cellular communication components, NFC components, Bluetooth® (or Bluetooth® Low Energy) components, Wi-Fi® components, and other communication components.

Instructions 650 may comprise software, a program, an application, an applet, an app, or other executable code for causing at least any of the processors 610 to perform any one or more of the methodologies discussed herein. The instructions 650 may reside, completely or partially, within at least one of the processors 610 (e.g., within the processor's cache memory), the memory/storage devices 620, or any suitable combination thereof. Furthermore, any portion of the instructions 650 may be transferred to the hardware resources 600 from any combination of the peripheral devices 604 or the databases 606. Accordingly, the memory of processors 610, the memory/storage devices 620, the peripheral devices 604, and the databases 606 are examples of computer-readable and machine-readable media.

Figure 7:
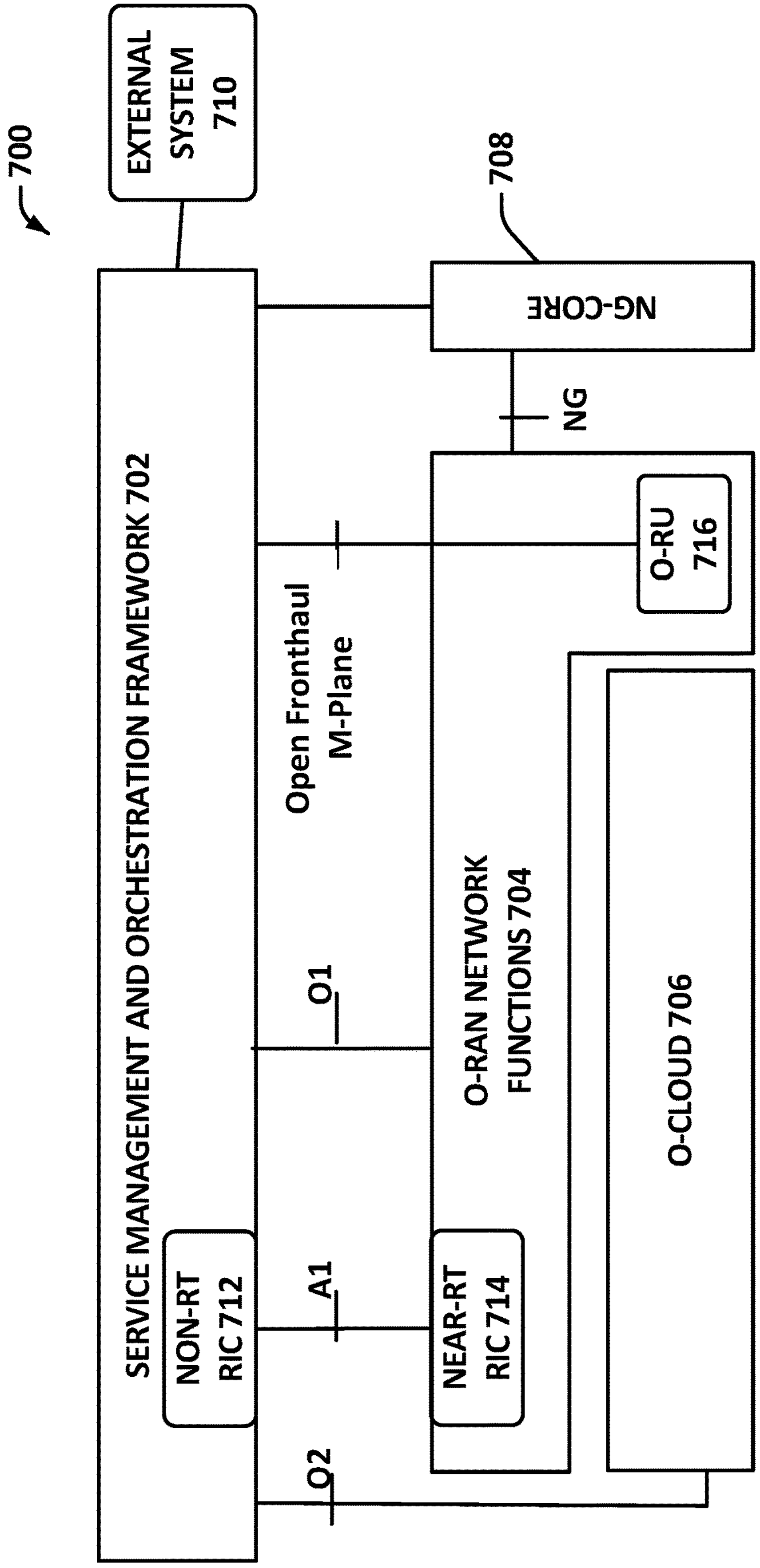
FIG. 7 provides a high-level view of an Open RAN (O-RAN) architecture in accordance with various embodiments.

FIG. 7 provides a high-level view of an Open RAN (O-RAN) architecture 700. The O-RAN architecture 700 includes four O-RAN defined interfaces—namely, the A1 interface, the O1 interface, the O2 interface, and the Open Fronthaul Management (M)-plane interface—which connect the Service Management and Orchestration (SMO) framework 702 to O-RAN network functions (NFs) 704 and the O-Cloud 706. The SMO 702 also connects with an external system 710, which provides enrighment data to the SMO 702. FIG. 7 also illustrates that the A1 interface terminates at an O-RAN Non-Real Time (RT) RAN Intelligent Controller (RIC) 712 in or at the SMO 702 and at the O-RAN Near-RT RIC 714 in or at the O-RAN NFs 704. The O-RAN NFs 704 can be VNFs such as VMs or containers, sitting above the O-Cloud 706 and/or Physical Network Functions (PNFs) utilizing customized hardware. All O-RAN NFs 704 are expected to support the O1 interface when interfacing the SMO framework 702. The O-RAN NFs 704 connect to the NG-Core 708 via the NG interface (which is a 3GPP defined interface). The Open Fronthaul M-plane interface between the SMO 702 and the O-RAN Radio Unit (O-RU) 716 supports the O-RU 716 management in the O-RAN hybrid model. The Open Fronthaul M-plane interface is an optional interface to the SMO 702 that is included for backward compatibility purposes, and is intended for management of the O-RU 716 in hybrid mode only. The management architecture of flat mode and its relation to the O1 interface for the O-RU 716 is for future study. The O-RU 716 termination of the O1 interface towards the SMO 702.

Figure 8:
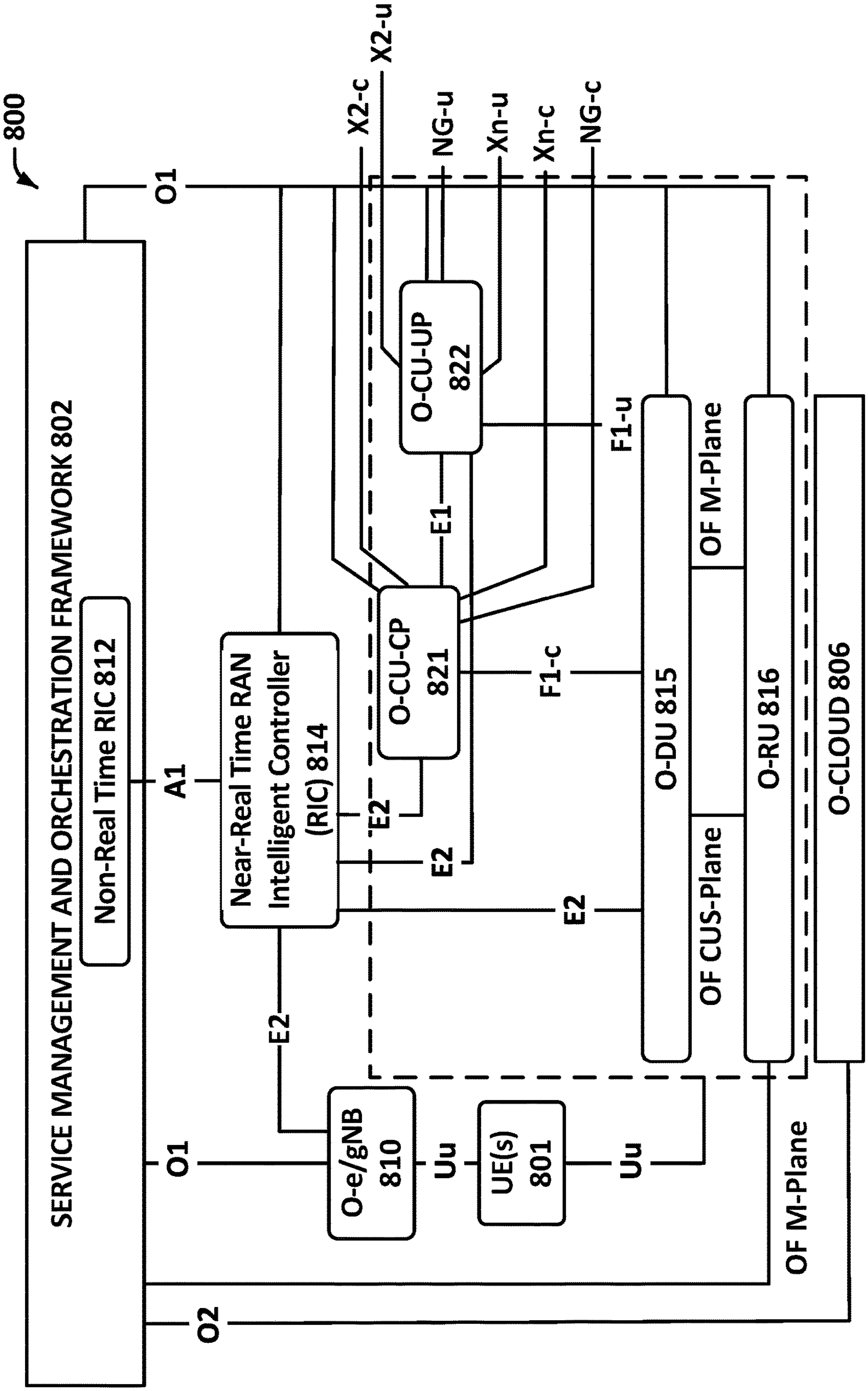
FIG. 8 shows the Uu interface between a UE and O-e/gNB as well as between the UE and O-RAN components.

FIG. 8 shows an O-RAN logical architecture 800 corresponding to the O-RAN architecture 700 of FIG. 7. In FIG. 8, the SMO 802 corresponds to the SMO 702, O-Cloud 806 corresponds to the O-Cloud 706, the non-RT RIC 812 corresponds to the non-RT RIC 712, the near-RT RIC 814 corresponds to the near-RT RIC 714, and the O-RU 816 corresponds to the O-RU 716 of FIG. 8, respectively. The O-RAN logical architecture 800 includes a radio portion and a management portion.

The management portion/side of the architectures 800 includes the SMO Framework 802 containing the non-RT RIC 812, and may include the O-Cloud 806. The O-Cloud 806 is a cloud computing platform including a collection of physical infrastructure nodes to host the relevant O-RAN functions (e.g., the near-RT RIC 814, O-CU-CP 821, O-CU-UP 822, and the O-DU 815), supporting software components (e.g., OS s, VMMs, container runtime engines, ML engines, etc.), and appropriate management and orchestration functions.

The radio portion/side of the logical architecture 800 includes the near-RT RIC 814, the O-RAN Distributed Unit (O-DU) 815, the O-RU 816, the O-RAN Central Unit—Control Plane (O-CU-CP) 821, and the O-RAN Central Unit—User Plane (O-CU-UP) 822 functions. The radio portion/side of the logical architecture 800 may also include the O-e/gNB 810.

The O-DU 815 is a logical node hosting RLC, MAC, and higher PHY layer entities/elements (High-PHY layers) based on a lower layer functional split. The O-RU 816 is a logical node hosting lower PHY layer entities/elements (Low-PHY layer) (e.g., FFT/iFFT, PRACH extraction, etc.) and RF processing elements based on a lower layer functional split. Virtualization of O-RU 816 is FFS. The O-CU-CP 821 is a logical node hosting the RRC and the control plane (CP) part of the PDCP protocol. The O O-CU-UP 822 is a logical node hosting the user plane part of the PDCP protocol and the SDAP protocol.

An E2 interface terminates at a plurality of E2 nodes. The E2 nodes are logical nodes/entities that terminate the E2 interface. For NR/5G access, the E2 nodes include the O-CU-CP 821, O-CU-UP 822, O-DU 815, or any combination of elements. For E-UTRA access the E2 nodes include the O-e/gNB 810. As shown in FIG. 8, the E2 interface also connects the O-e/gNB 810 to the Near-RT RIC 814. The protocols over E2 interface are based exclusively on Control Plane (CP) protocols. The E2 functions are grouped into the following categories: (a) near-RT RIC 814 services (REPORT, INSERT, CONTROL and POLICY); and (b) near-RT RIC 814 support functions, which include E2 Interface Management (E2 Setup, E2 Reset, Reporting of General Error Situations, etc.) and Near-RT RIC Service Update (e.g., capability exchange related to the list of E2 Node functions exposed over E2).

FIG. 8 shows the Uu interface between a UE 801 and O-e/gNB 810 as well as between the UE 801 and O-RAN components. The Uu interface is a 3GPP defined interface, which includes a complete protocol stack from L1 to L3 and terminates in the NG-RAN or E-UTRAN. The O-e/gNB 810 is an LTE eNB, a 5G gNB or ng-eNB that supports the E2 interface. The O-e/gNB 810 may be the same or similar as AN 408 and/or AN 504 discussed previously. The UE 801 may correspond to UE 402 and/or UE 502 discussed with respect to FIGS. 4 and 5, and/or the like. There may be multiple UEs 801 and/or multiple O-e/gNB 810, each of which may be connected to one another the via respective Uu interfaces. Although not shown in FIG. 8, the O-e/gNB 810 supports O-DU 815 and O-RU 816 functions with an Open Fronthaul interface between them.

The Open Fronthaul (OF) interface(s) is/are between O-DU 815 and O-RU 816 functions. The OF interface(s) includes the Control User Synchronization (CUS) Plane and Management (M) Plane. FIGS. 7 and 8 also show that the O-RU 816 terminates the OF M-Plane interface towards the O-DU 815 and optionally towards the SMO 802. The O-RU 816 terminates the OF CUS-Plane interface towards the O-DU 815 and the SMO 802.

The F1-c interface connects the O-CU-CP 821 with the O-DU 815. As defined by 3GPP, the F1-c interface is between the gNB-CU-CP and gNB-DU nodes. However, for purposes of O-RAN, the F1-c interface is adopted between the O-CU-CP 821 with the O-DU 815 functions while reusing the principles and protocol stack defined by 3GPP and the definition of interoperability profile specifications.

The F1-u interface connects the O-CU-UP 822 with the O-DU 815. As defined by 3GPP, the F1-u interface is between the gNB-CU-UP and gNB-DU nodes. However, for purposes of O-RAN, the F1-u interface is adopted between the O-CU-UP 822 with the O-DU 815 functions while reusing the principles and protocol stack defined by 3GPP and the definition of interoperability profile specifications.

The NG-c interface is defined by 3GPP as an interface between the gNB-CU-CP and the AMF in the 5GC. The NG-c is also referred as the N2 interface. The NG-u interface is defined by 3GPP, as an interface between the gNB-CU-UP and the UPF in the 5GC. The NG-u interface is referred as the N3 interface. In O-RAN, NG-c and NG-u protocol stacks defined by 3GPP are reused and may be adapted for 0-RAN purposes.

The X2-c interface is defined in 3GPP for transmitting control plane information between eNBs or between eNB and en-gNB in EN-DC. The X2-u interface is defined in 3GPP for transmitting user plane information between eNBs or between eNB and en-gNB in EN-DC. In O-RAN, X2-c and X2-u protocol stacks defined by 3GPP are reused and may be adapted for 0-RAN purposes The Xn-c interface is defined in 3GPP for transmitting control plane information between gNBs, ng-eNBs, or between an ng-eNB and gNB. The Xn-u interface is defined in 3GPP for transmitting user plane information between gNBs, ng-eNBs, or between ng-eNB and gNB. In O-RAN, Xn-c and Xn-u protocol stacks defined by 3GPP are reused and may be adapted for 0-RAN purposes The E1 interface is defined by 3GPP as being an interface between the gNB-CU-CP (e.g., gNB-CU-CP 3728) and gNB-CU-UP. In O-RAN, E1 protocol stacks defined by 3GPP are reused and adapted as being an interface between the O-CU-CP 821 and the O-CU-UP 822 functions.

The O-RAN Non-Real Time (RT) RAN Intelligent Controller (RIC) 812 is a logical function within the SMO framework 702, 802 that enables non-real-time control and optimization of RAN elements and resources; AI/machine learning (ML) workflow(s) including model training, inferences, and updates; and policy-based guidance of applications/features in the Near-RT RIC 814.

The O-RAN near-RT RIC 814 is a logical function that enables near-real-time control and optimization of RAN elements and resources via fine-grained data collection and actions over the E2 interface. The near-RT RIC 814 may include one or more AI/ML workflows including model training, inferences, and updates.

The non-RT RIC 812 can be an ML training host to host the training of one or more ML models. ML training can be performed offline using data collected from the RIC, O-DU 815 and O-RU 816. For supervised learning, non-RT RIC 812 is part of the SMO 802, and the ML training host and/or ML model host/actor can be part of the non-RT RIC 812 and/or the near-RT RIC 814. For unsupervised learning, the ML training host and ML model host/actor can be part of the non-RT RIC 812 and/or the near-RT RIC 814. For reinforcement learning, the ML training host and ML model host/actor may be co-located as part of the non-RT RIC 812 and/or the near-RT RIC 814. In some implementations, the non-RT RIC 812 may request or trigger ML model training in the training hosts regardless of where the model is deployed and executed. ML models may be trained and not currently deployed.

In some implementations, the non-RT RIC 812 provides a query-able catalog for an ML designer/developer to publish/install trained ML models (e.g., executable software components). In these implementations, the non-RT RIC 812 may provide discovery mechanism if a particular ML model can be executed in a target ML inference host (MF), and what number and type of ML models can be executed in the MF. For example, there may be three types of ML catalogs made disoverable by the non-RT RIC 812: a design-time catalog (e.g., residing outside the non-RT RIC 812 and hosted by some other ML platform(s)), a training/deployment-time catalog (e.g., residing inside the non-RT RIC 812), and a run-time catalog (e.g., residing inside the non-RT RIC 812). The non-RT RIC 812 supports necessary capabilities for ML model inference in support of ML assisted solutions running in the non-RT RIC 812 or some other ML inference host. These capabilities enable executable software to be installed such as VMs, containers, etc. The non-RT RIC 812 may also include and/or operate one or more ML engines, which are packaged software executable libraries that provide methods, routines, data types, etc., used to run ML models. The non-RT RIC 812 may also implement policies to switch and activate ML model instances under different operating conditions.

The non-RT RIC 82 is be able to access feedback data (e.g., FM and PM statistics) over the O1 interface on ML model performance and perform necessary evaluations. If the ML model fails during runtime, an alarm can be generated as feedback to the non-RT RIC 812. How well the ML model is performing in terms of prediction accuracy or other operating statistics it produces can also be sent to the non-RT RIC 812 over O1. The non-RT RIC 812 can also scale ML model instances running in a target MF over the O1 interface by observing resource utilization in MF. The environment where the ML model instance is running (e.g., the MF) monitors resource utilization of the running ML model. This can be done, for example, using an ORAN-SC component called ResourceMonitor in the near-RT RIC 814 and/or in the non-RT RIC 812, which continuously monitors resource utilization. If resources are low or fall below a certain threshold, the runtime environment in the near-RT RIC 814 and/or the non-RT RIC 812 provides a scaling mechanism to add more ML instances. The scaling mechanism may include a scaling factor such as an number, percentage, and/or other like data used to scale up/down the number of ML instances. ML model instances running in the target ML inference hosts may be automatically scaled by observing resource utilization in the MF. For example, the Kubernetes® (K8s) runtime environment typically provides an auto-scaling feature.

The A1 interface is between the non-RT RIC 812 (within or outside the SMO 802) and the near-RT RIC 814. The A1 interface supports three types of services, including a Policy Management Service, an Enrichment Information Service, and ML Model Management Service. A1 policies have the following characteristics compared to persistent configuration: A1 policies are not critical to traffic; A1 policies have temporary validity; A1 policies may handle individual UE or dynamically defined groups of UEs; A1 policies act within and take precedence over the configuration; and A1 policies are non-persistent, e.g., do not survive a restart of the near-RT RIC.

EXAMPLE PROCEDURES

In some embodiments, the electronic device(s), network(s), system(s), chip(s) or component(s), or portions or implementations thereof, of FIGS. 4-8, or some other FIG. herein, may be configured to perform one or more processes, techniques, or methods as described herein, or portions thereof.

Figure 9:
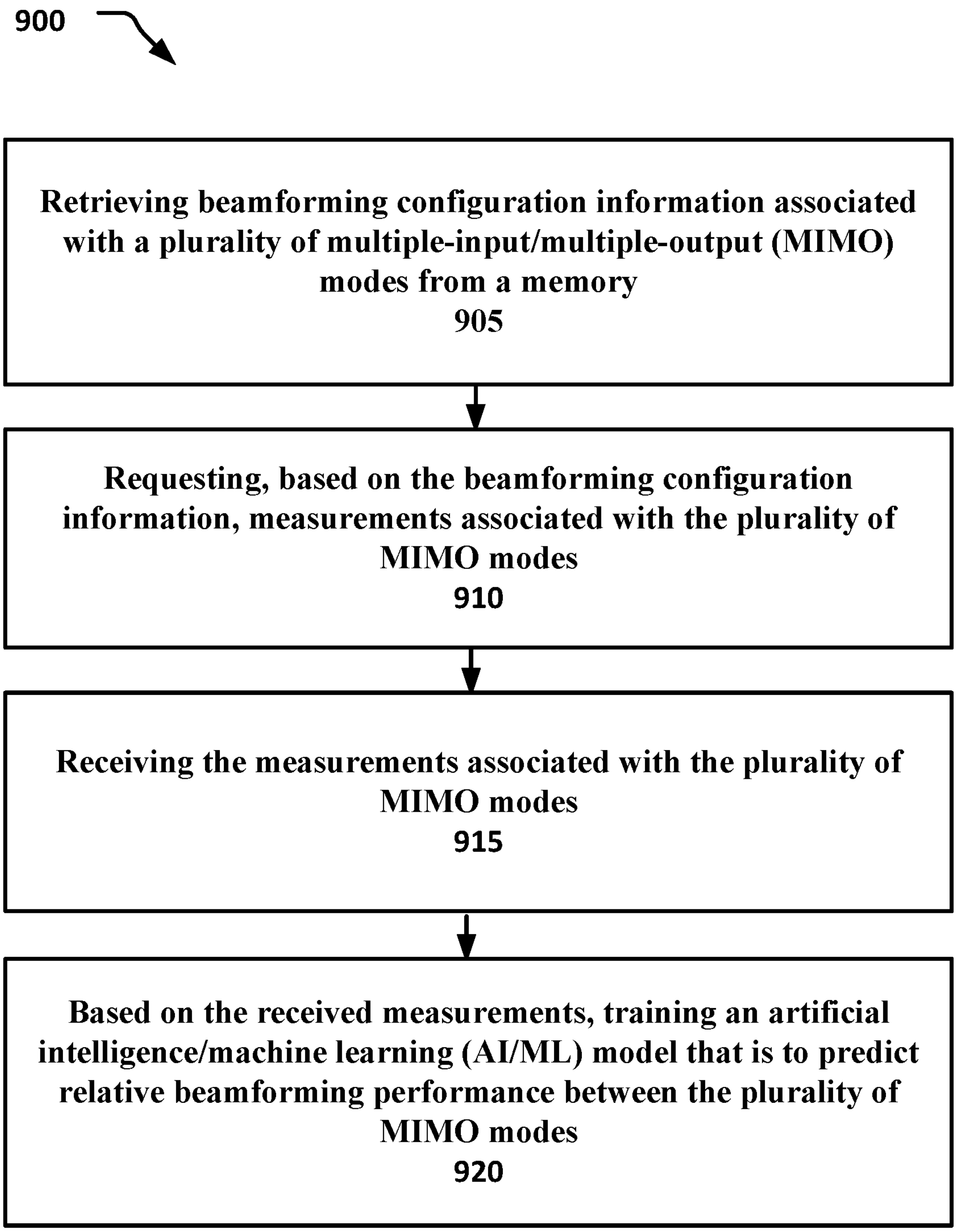
FIGS. 9, 10, and 11 depict examples of procedures for practicing the various embodiments discussed herein.

One such process is depicted in FIG. 9. In this example, process 900 may be performed by a controller (e.g., RAN intelligent controller (RIC)) or a portion thereof. For example, the process may include, at 905, retrieving beamforming configuration information associated with a plurality of multiple-input/multiple-output (MIMO) modes from a memory. The process further includes, at 910, requesting, based on the beamforming configuration information, measurements associated with the plurality of MIMO modes. The process further includes, at 915, receiving the measurements associated with the plurality of MIMO modes. The process further includes, at 920, based on the received measurements, training an artificial intelligence/machine learning (AI/ML) model that is to predict relative beamforming performance between the plurality of MIMO modes.

Figure 10:
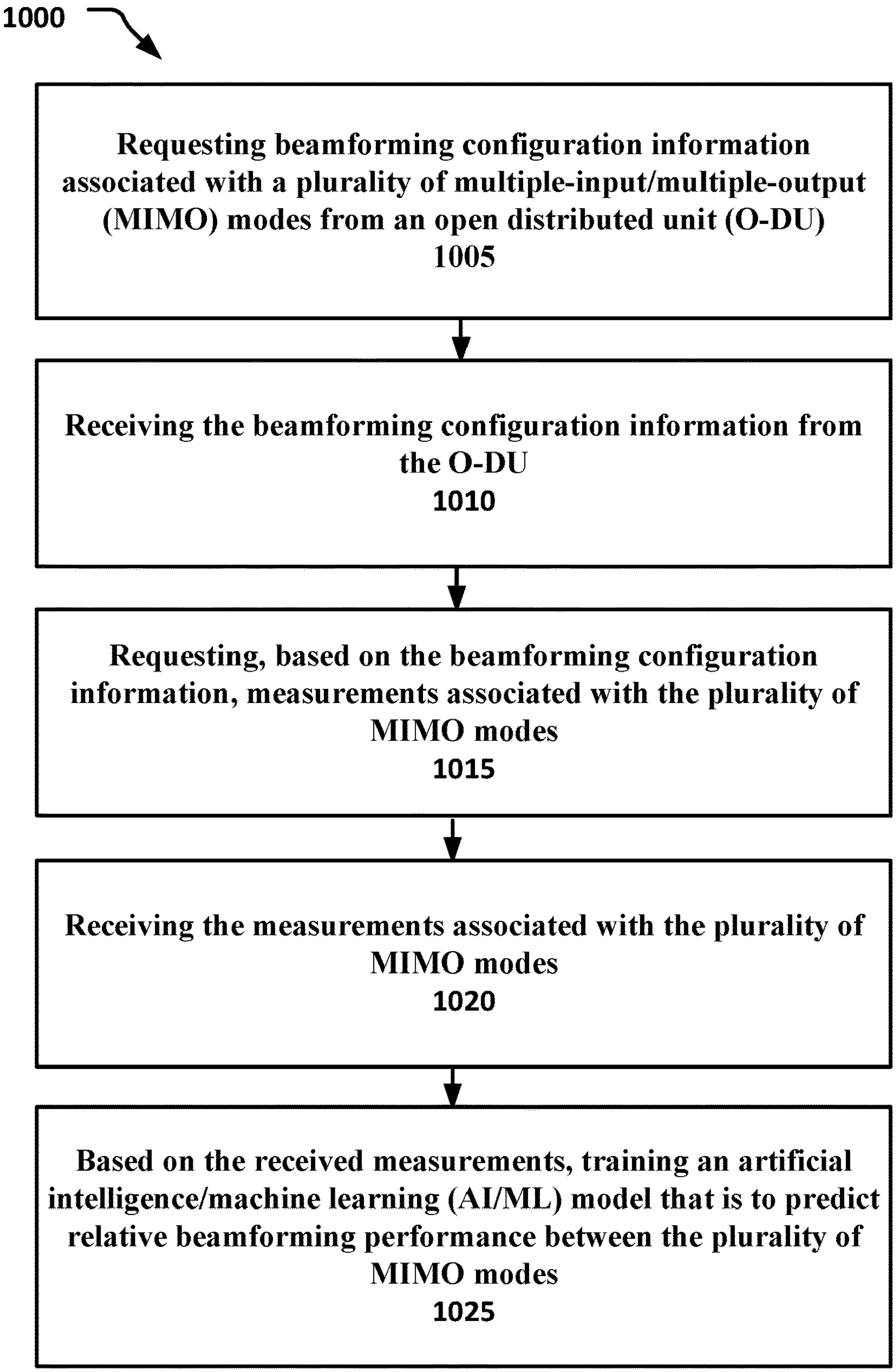

Another such process is illustrated in FIG. 10. In this example, process 1000 includes, at 1005, requesting beamforming configuration information associated with a plurality of multiple-input/multiple-output (MIMO) modes from a near-real time (near-RT) RTC. The process further includes, at 1010, receiving the beamforming configuration information from the near-RT RTC. The process further includes, at 1015, requesting, based on the beamforming configuration information, measurements associated with the plurality of MIMO modes. The process further includes, at 1020, receiving the measurements associated with the plurality of MIMO modes. The process further includes, at 1025, based on the received measurements, training an artificial intelligence/machine learning (AI/ML) model that is to predict relative beamforming performance between the plurality of MIMO modes.

Figure 11:
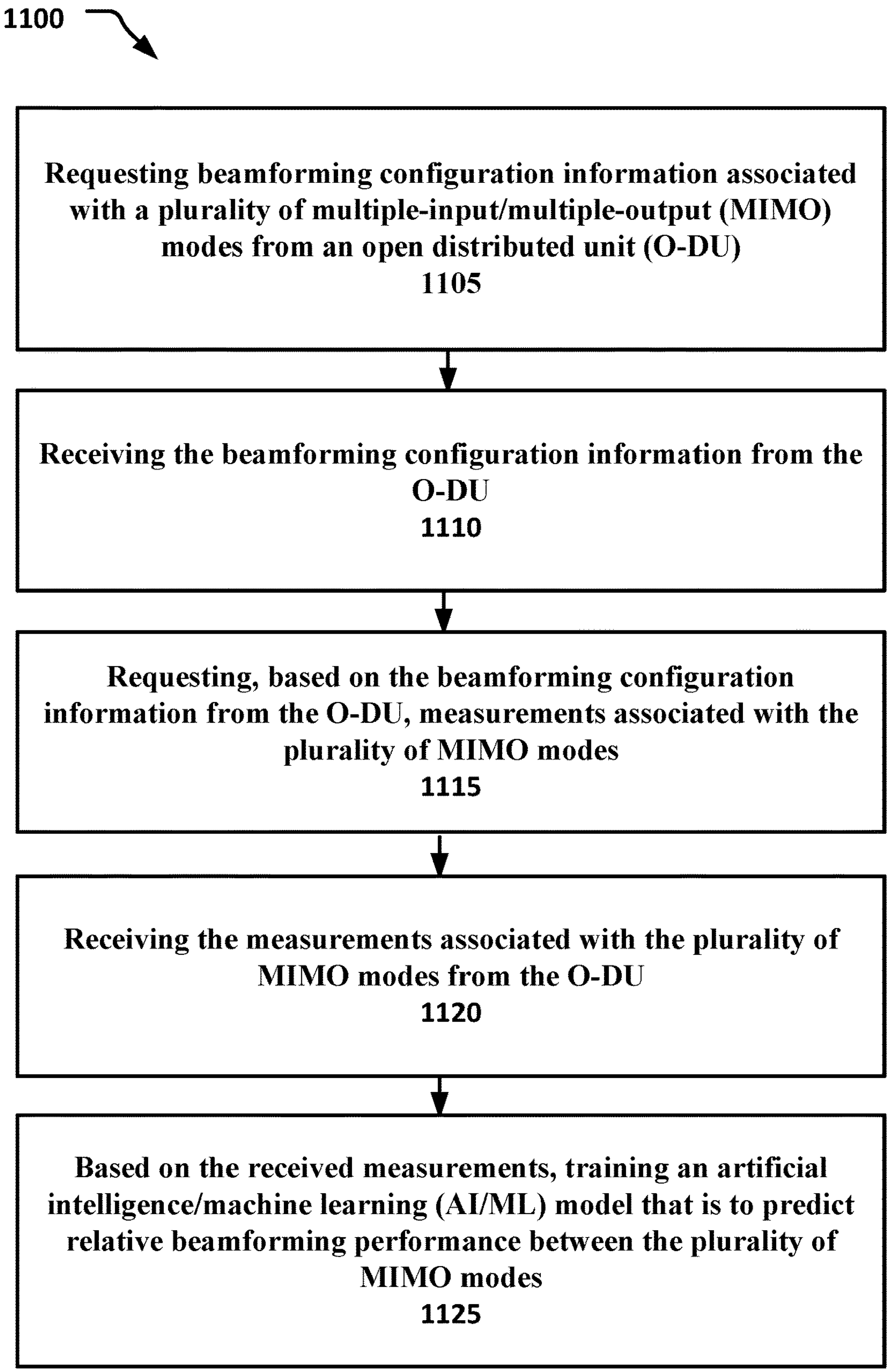

Another such process is illustrated in FIG. 11. In this example, process 1100 includes, at 1105, requesting beamforming configuration information associated with a plurality of multiple-input/multiple-output (MIMO) modes from a near-real time (near-RT) RTC. The process further includes, at 1110, receiving the beamforming configuration information from the near-RT RTC. The process further includes, at 1115, requesting, based on the beamforming configuration information from an open distributed unit (O-DU), measurements associated with the plurality of MIMO modes. The process further includes, at 1120, receiving the measurements associated with the plurality of MIMO modes from the O-DU. The process further includes, at 1125, based on the received measurements, training an artificial intelligence/machine learning (AI/ML) model that is to predict relative beamforming performance between the plurality of MIMO modes.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

Example 1 may include a method of controlling beamforming modes, comprising one or more of:

- requesting by a controller a report of beamforming modes supported in a base station;
- reporting from a base station an abstracted description of modes supported;
- providing a first set of measurements from a base station to a controller for one or more of reported modes;

training an algorithm in the controller for predicting relative performance of at least some of the reported modes based on the first set of received measurements;

providing a second set of measurements from a base station to a controller;

predicting relative performance of at least some of the reported modes based on a second set of received measurements; and/or sending mode recommendation from controller to base station based on predicted relative performance.

Example 2 may include the method according to example 1 or some other example herein, where reported abstracted beamforming modes supported is a number of modes supported.

Example 3 may include the method according to examples 1 or 2 or some other example herein, where reported abstracted beamforming modes includes information about circumstances that each mode is preferably suitable for.

Example 3a may include the method according to examples 1, 2 or 3 or some other example herein, where an abstracted description of modes supported is provided separately for multiple MIMO modes.

Example 3b may include the method according to examples 1, 2, 3 or 3a or some other example herein, where a first set of measurements from a base station to a controller for one or more of reported modes is provided separately for multiple MIMO modes.

Example 3c may include the method according to examples 1, 2, 3, 3a or 3b or some other example herein, where training an algorithm in the controller for predicting relative performance of at least some of the reported modes based on the first set of received measurements is performed separately for multiple MIMO modes.

Example 3d may include the method according to examples 1, 2, 3, 3a, 3b or 3c or some other example herein, where training an algorithm in the controller for predicting relative performance of at least some of the reported modes based on the first set of received measurements is performed separately for multiple MIMO modes.

Example 3e may include the method according to examples 1, 2, 3, 3a, 3b, 3c or 3d or some other example herein, where predicting relative performance of at least some of the reported modes based on a second set of received measurements is performed separately for multiple MIMO modes.

Example 3f may include the method according to examples 1, 2, 3, 3a, 3b, 3c, 3d or 3e or some other example herein, where sending mode recommendation from controller to base station based on predicted relative performance is performed separately for multiple MIMO modes.

Example 4 may include the method according to example 1 or 3d or some other example herein, where measurements from outside the base station are additionally used for training Example 5 may include the method according to example 1 or 3e or some other example herein, where measurements from outside the base station are additionally used for prediction.

Example 6 may include the method according to example 1 or some other example herein, where requesting by a controller a report of beamforming modes supported in a base station is over O1.

Example 7 may include the method according to example 1 or some other example herein, where requesting by a controller a report of beamforming modes supported in a base station is over A1 and E2.

Example 8 may include the method according to example 1 or 3a or some other example herein, where reporting from a base station an abstracted description of modes supported is over 01.

Example 9 may include the method according to example 1 or 3a or some other example herein, where reporting from a base station an abstracted description of modes supported is over A1 and E2.

Example 10 may include the method according to example 1 or 3b or some other example herein, where providing first set of measurements from a base station to a controller for one or more of reported modes is over 01.

Example 11 may include the method according to example 1 or 3d or some other example herein, where algorithm training is in O-RAN non-RT RIC.

Example 12 may include the method according to example 1 or 3d or some other example herein, where algorithm training is in O-RAN near-RT RIC.

Example 13 may include the method according to example 1 or some other example herein, where providing second set of measurements from a base station to a controller is over E2.

Example 14 may include the method according to example 1 or 3e or some other example herein, where prediction is in O-RAN non-RT RIC.

Example 15 may include the method according to example 1 or 3e or some other example herein, where prediction is in O-RAN near-RT RIC.

Example 16 may include the method according to example 1 or 3f some other example herein, where mode recommendation is over E2.

Example 17 may include the method according to example 1 or some other example herein, where the trained model is deployed to near-RT RIC over 01.

Example 18 may include the method according to example 1 or some other example herein, where the trained model is deployed to near-RT RIC over 02.

Example 19 may include the method according to examples 1-18 or some other example herein, where the mode recommendation from controller to base station is chosen to improve the training data set.

Example 20 may include the method according to examples 1-19 or some other example herein, where the O-DU reports computational complexity measurements of beamforming modes.

Example 21 may include a method of a controller (e.g., RIC, such as near-RT RIC and/or non-RT RIC) for controlling beamforming modes, the method comprising:

requesting a report of beamforming modes supported in a base station;

receiving a report from the base station of one or more beamforming modes supported by the base station;

receiving a first set of measurements from the base station for one or more of the reported beamforming modes;

training a machine learning model for predicting relative performance of at least one of the reported modes based on the first set of measurements;

receiving a second set of measurements from the base station for one or more of the reported beamforming modes;

predicting relative performance of at least one of the reported beamforming modes based on the second set of measurements; and sending a mode recommendation to the base station based on the predicted relative performance.

Example 22 may include the method according to example 21 or some other example herein, where the report of beamforming modes supported indicates a number of beamforming modes supported.

Example 23 may include the method according to examples 21 or 22 or some other example herein, wherein the report of beamforming modes supported information about circumstances for which each mode is suitable.

Example 24 may include the method according to example 21-23 or some other example herein, wherein the training is further based on measurements from outside the base station.

Example 25 may include the method according to example 21-24 or some other example herein, wherein the prediction is further based on measurements from outside the base station.

Example 26 may include the method according to example 21-25 or some other example herein, wherein the request is transmitted over a O1 interface.

Example 27 may include the method according to example 21-26 or some other example herein, wherein the request is transmitted over an A1 and/or E2 interface.

Example 28 may include the method according to examples 21-27 or some other example herein, wherein respective reports of beamforming modes supported are provided for multiple MIMO modes.

Example 29 may include the method according to examples 21-28 or some other example herein, wherein the first set of measurements for one or more of the reported beamforming modes includes separate measurements for multiple MIMO modes.

Example 30 may include the method according to examples 21-29 or some other example herein, wherein the training the machine learning model based on the first set of received measurements is performed separately for multiple MIMO modes.

Example 31 may include the method according to examples 21-30 or some other example herein, wherein the predicting relative performance includes separate predictions for multiple MIMO modes.

Example 32 may include the method according to examples 21-31 or some other example herein, wherein the sending the mode recommendation includes sending separate mode recommendations for multiple MIMO modes.

Example 33 may include a method of a base station, the method comprising:

- receiving, from a controller, a request for a report of beamforming modes supported by the base station;
- generating the report of one or more beamforming modes supported by the base station for transmission to the controller;
- sending a first set of measurements to the controller for one or more of the reported beamforming modes to train a machine learning model for predicting relative performance of at least one of the reported modes based on the first set of measurements;
- sending a second set of measurements to the controller for one or more of the reported beamforming modes for the machine learning model to predict relative performance of at least one of the reported beamforming modes based on the second set of measurements; and
- receiving a mode recommendation from the controller based on the predicted relative performance.

Example 34 may include the method according to example 33 or some other example herein, where the report of beamforming modes supported indicates a number of beamforming modes supported.

Example 35 may include the method according to examples 33-34 or some other example herein, wherein the report of beamforming modes supported information about circumstances for which each mode is suitable.

Example 36 may include the method according to example 33-35 or some other example herein, wherein the machine learning model is trained further based on measurements from outside the base station.

Example 37 may include the method according to example 33-36 or some other example herein, wherein the prediction is further based on measurements from outside the base station.

Example 38 may include the method according to example 33-37 or some other example herein, wherein the request is received via a O1 interface.

Example 39 may include the method according to example 33-38 or some other example herein, wherein the request is received via an A1 and/or E2 interface.

Example 40 may include the method according to examples 33-39 or some other example herein, wherein respective reports of beamforming modes supported are provided for multiple MIMO modes.

Example 41 may include the method according to examples 33-40 or some other example herein, wherein the first set of measurements for one or more of the reported beamforming modes includes separate measurements for multiple MIMO modes.

Example 42 may include the method according to examples 33-41 or some other example herein, wherein receiving the mode recommendation includes receiving separate mode recommendations for multiple MIMO modes.

Example X1. An apparatus comprising:

- memory to store beamforming configuration information associated with a plurality of multiple-input/multiple-output (MIMO) modes; and
- processing circuitry, coupled with the memory, to:
  - retrieve the beamforming configuration information from the memory;
  - request, based on the beamforming configuration information, measurements associated with the plurality of MIMO modes;
  - receive the measurements associated with the plurality of MIMO modes; and
  - based on the received measurements, train an artificial intelligence/machine learning (AI/ML) model that is to predict relative beamforming performance between the plurality of MIMO modes.

Example X2 includes the apparatus of example X1 or some other example herein, wherein the beamforming configuration information includes one or more of: a mode identifier, an uplink/downlink indicator, a signal-to-noise ratio (SNR) range indicator, a user equipment (UE) mobility indicator, and a computational complexity indicator.

Example X3 includes the apparatus of example X1 or some other example herein, wherein the processing circuitry is further to deploy the AI/ML model to a near-real time (near-RT) RIC.

Example X4 includes the apparatus of example X1 or some other example herein, wherein the measurements associated with the plurality of MIMO modes are a first set of measurements associated with the plurality of MIMO modes and the processing circuitry is further to:

- receive a second set of measurements associated with the plurality of MIMO modes; and
- re-train the AI/ML model based on the second set of measurements associated with the plurality of MIMO modes.

Example X5 includes the apparatus of example X1 or some other example herein, wherein the measurements associated with the plurality of MIMO modes include a throughput measurement, a signal-to-noise ratio (SINR) measurement, or enrichment information.

Example X6 includes the apparatus of example X5 or some other example herein, wherein the measurements associated with the plurality of MIMO modes include a multiple user MIMO (MU-MIMO)-related identifier.

Example X7 includes the apparatus of example X6 or some other example herein, wherein the MU-MIMO-related identifier includes: a UE group identifier, a list of UEs in a group, or an indicator that a UE was part of a MU-MIMO group during a measurement.

Example X8 includes the apparatus of any of examples X1-X7 or some other example herein, wherein the processing circuitry is to implement a non-real time (non-RT) radio access network (RAN) intelligent controller (RIC).

Example X9 includes the apparatus of any of examples X1-X7 or some other example herein, wherein the measurements associated with the plurality of MIMO modes are requested and received from an open distributed unit (O-DU).

Example X10 includes one or more computer-readable media storing instructions that, when executed by one or more processors, cause a non-real time (non-RT) radio access network (RAN) intelligent controller (RIC) to:

- request beamforming configuration information associated with a plurality of multiple-input/multiple-output (MIMO) modes from an open distributed unit (O-DU);
- receive the beamforming configuration information from the O-DU;
- request, based on the beamforming configuration information, measurements associated with the plurality of MIMO modes;
- receive the measurements associated with the plurality of MIMO modes; and
- based on the received measurements, train an artificial intelligence/machine learning (AI/ML) model that is to predict relative beamforming performance between the plurality of MIMO modes.

Example X11 includes the one or more computer-readable media of example X10 or some other example herein, wherein the beamforming configuration information includes one or more of: a mode identifier, an uplink/downlink indicator, a signal-to-noise ratio (SNR) range indicator, a user equipment (UE) mobility indicator, and a computational complexity indicator.

Example X12 includes the one or more computer-readable media of example X10 or some other example herein, wherein the media further stores instructions to deploy the AI/ML model to the near-RT RIC.

Example X13 includes the one or more computer-readable media of example X10 or some other example herein, wherein the measurements associated with the plurality of MIMO modes are a first set of measurements associated with the plurality of MIMO modes and the media further stores instructions to:

- receive a second set of measurements associated with the plurality of MIMO modes; and
- re-train the AI/ML model based on the second set of measurements associated with the plurality of MIMO modes.

Example X14 includes the one or more computer-readable media of example X10 or some other example herein, wherein the measurements associated with the plurality of MIMO modes include a throughput measurement, a signal-to-noise ratio (SINR) measurement, or enrichment information.

Example X15 includes the one or more computer-readable media of example X14 or some other example herein, wherein the measurements associated with the plurality of MIMO modes include a multiple user MIMO (MU-MIMO)-related identifier.

Example X16 includes the one or more computer-readable media of example X15 or some other example herein, wherein the MU-MIMO-related identifier includes: a UE group identifier, a list of UEs in a group, or an indicator that a UE was part of a MU-MIMO group during a measurement.

Example X17 includes the one or more computer-readable media of any of examples X10-X16 or some other example herein, wherein the measurements associated with the plurality of MIMO modes are requested and received from an open distributed unit (O-DU).

Example X18 includes one or more computer-readable media storing instructions that, when executed by one or more processors, cause a non-real time (non-RT) radio access network (RAN) intelligent controller (RIC) to:

- request beamforming configuration information associated with a plurality of multiple-input/multiple-output (MIMO) modes from an open distributed unit (O-DU);
- receive the beamforming configuration information from the O-DU;
- request, based on the beamforming configuration information from the O-DU, measurements associated with the plurality of MIMO modes;
- receive the measurements associated with the plurality of MIMO modes from the O-DU; and
- based on the received measurements, train an artificial intelligence/machine learning (AI/ML) model that is to predict relative beamforming performance between the plurality of MIMO modes.

Example X19 includes the one or more computer-readable media of example X18 or some other example herein, wherein the beamforming configuration information includes one or more of: a mode identifier, an uplink/downlink indicator, a signal-to-noise ratio (SNR) range indicator, a user equipment (UE) mobility indicator, and a computational complexity indicator.

Example X20 includes the one or more computer-readable media of example X18 or some other example herein, wherein the media further stores instructions to deploy the AI/ML model to the near-RT RIC.

Example X21 includes the one or more computer-readable media of example X18 or some other example herein, wherein the measurements associated with the plurality of MIMO modes are a first set of measurements associated with the plurality of MIMO modes and the media further stores instructions to:

- receive a second set of measurements associated with the plurality of MIMO modes; and
- re-train the AI/ML model based on the second set of measurements associated with the plurality of MIMO modes.

Example X22 includes the one or more computer-readable media of example X18 or some other example herein, wherein the measurements associated with the plurality of MIMO modes include a throughput measurement, a signal-to-noise ratio (SINR) measurement, or enrichment information.

Example X23 includes the one or more computer-readable media of example X22 or some other example herein, wherein the measurements associated with the plurality of MIMO modes include a multiple user MIMO (MU-MIMO)-related identifier.

Example X24 includes the one or more computer-readable media of example X23 or some other example herein, wherein the MU-MIMO-related identifier includes: a UE group identifier, a list of UEs in a group, or an indicator that a UE was part of a MU-MIMO group during a measurement.

Example Z01 may include an apparatus comprising means to perform one or more elements of a method described in or related to any of examples 1-X24, or any other method or process described herein.

Example Z02 may include one or more non-transitory computer-readable media comprising instructions to cause an electronic device, upon execution of the instructions by one or more processors of the electronic device, to perform one or more elements of a method described in or related to any of examples 1-X24, or any other method or process described herein.

Example Z03 may include an apparatus comprising logic, modules, or circuitry to perform one or more elements of a method described in or related to any of examples 1-X24, or any other method or process described herein.

Example Z04 may include a method, technique, or process as described in or related to any of examples 1-X24, or portions or parts thereof.

Example Z05 may include an apparatus comprising: one or more processors and one or more computer-readable media comprising instructions that, when executed by the one or more processors, cause the one or more processors to perform the method, techniques, or process as described in or related to any of examples 1-X24, or portions thereof.

Example Z06 may include a signal as described in or related to any of examples 1-X24, or portions or parts thereof.

Example Z07 may include a datagram, packet, frame, segment, protocol data unit (PDU), or message as described in or related to any of examples 1-X24, or portions or parts thereof, or otherwise described in the present disclosure.

Example Z08 may include a signal encoded with data as described in or related to any of examples 1-X24, or portions or parts thereof, or otherwise described in the present disclosure.

Example Z09 may include a signal encoded with a datagram, packet, frame, segment, protocol data unit (PDU), or message as described in or related to any of examples 1-X24, or portions or parts thereof, or otherwise described in the present disclosure.

Example Z10 may include an electromagnetic signal carrying computer-readable instructions, wherein execution of the computer-readable instructions by one or more processors is to cause the one or more processors to perform the method, techniques, or process as described in or related to any of examples 1-X24, or portions thereof.

Example Z11 may include a computer program comprising instructions, wherein execution of the program by a processing element is to cause the processing element to carry out the method, techniques, or process as described in or related to any of examples 1-X24, or portions thereof.

Example Z12 may include a signal in a wireless network as shown and described herein.

Example Z13 may include a method of communicating in a wireless network as shown and described herein.

Example Z14 may include a system for providing wireless communication as shown and described herein.

Example Z15 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Abbreviations

Unless used differently herein, terms, definitions, and abbreviations may be consistent with terms, definitions, and abbreviations defined in 3GPP TR 21.905 v16.0.0 (2019 June). For the purposes of the present document, the following abbreviations may apply to the examples and embodiments discussed herein.

| | |
|---|---|
| 3GPP | Third Generation Partnership Project |
| 4G | Fourth Generation |
| 5G | Fifth Generation |
| 5GC | 5G Core network |
| AC | Application client |
| ACR | Application Context Relocation |
| ACK | Acknowledgement |
| ACID | Application Client Identification |
| AF | Application Function |
| AM | Acknowledged Mode |
| AMBRA | Aggregate Maximum Bit Rate |
| AMF | Access and Mobility Management Function |
| AN | Access Network |
| ANR | Automatic Neighbour Relation |
| AOA | Angle of Arrival |
| AP | Application Protocol, Antenna Port, Access Point |
| API | Application Programming Interface |
| APN | Access Point Name |
| ARP | Allocation and Retention Priority |
| ARQ | Automatic Repeat Request |
| AS | Access Stratum |
| ASP | Application Service Provider |
| ASN.1 | Abstract Syntax Notation One |
| AUSF | Authentication Server Function |
| AWGN | Additive White Gaussian Noise |
| BAP | Backhaul Adaptation Protocol |
| BCH | Broadcast Channel |
| BER | Bit Error Ratio |
| BFD | Beam Failure Detection |
| BLER | Block Error Rate |
| BPSK | Binary Phase Shift Keying |
| BRAS | Broadband Remote Access Server |
| BSS | Business Support System |
| BS | Base Station |
| BSR | Buffer Status Report |
| BW | Bandwidth |
| BWP | Bandwidth Part |
| C-RNTI | Cell Radio Network Temporary Identity |
| CA | Carrier Aggregation, Certification Authority |
| CAPEX | CAPital EXpenditure |
| CBRA | Contention Based Random Access |
| CC | Component Carrier, Country Code, Cryptographic Checksum |
| CCA | Clear Channel Assessment |
| CCE | Control Channel Element |
| CCCH | Common Control Channel |
| CE | Coverage Enhancement |
| CDM | Content Delivery Network |
| CDMA | Code-Division Multiple Access |
| CDR | Charging Data Request |
| CDR | Charging Data Response |
| CFRA | Contention Free Random Access |
| CG | Cell Group |
| CGF | Charging Gateway Function |
| CHF | Charging Function |
| CI | Cell Identity |
| CID | Cell-ID (e.g., positioning method) |
| CIM | Common Information Model |
| CIR | Carrier to Interference Ratio |
| CK | Cipher Key |
| CM | Connection Management, Conditional Mandatory |

-continued

| | |
|---|---|
| CMAS | Commercial Mobile Alert Service |
| CMD | Command |
| CMS | Cloud Management System |
| CO | Conditional Optional |
| CoMP | Coordinated Multi-Point |
| CORESET | Control Resource Set |
| COTS | Commercial Off-The-Shelf |
| CP | Control Plane, Cyclic Prefix, Connection Point |
| CPD | Connection Point Descriptor |
| CPE | Customer Premise Equipment |
| CPICH | Common Pilot Channel |
| CQI | Channel Quality Indicator |
| CPU | CSI processing unit, Central Processing Unit |
| C/R | Command/Response field bit |
| CRAN | Cloud Radio Access Network, Cloud RAN |
| CRB | Common Resource Block |
| CRC | Cyclic Redundancy Check |
| CRI | Channel-State Information Resource Indicator, CSI-RS Resource Indicator |
| C-RNTI | Cell RNTI |
| CS | Circuit Switched |
| CSCF | call session control function |
| CSAR | Cloud Service Archive |
| CSI | Channel-State Information |
| CSI-IM | CSI Interference Measurement |
| CSI-RS | CSI Reference Signal |
| CSI-RSRP | CSI reference signal received power |
| CSI-RSRQ | CSI reference signal received quality |
| CSI-SINR | CSI signal-to-noise and interference ratio |
| CSMA | Carrier Sense Multiple Access |
| CSMA/CA | CSMA with collision avoidance |
| CSS | Common Search Space, Cell-specific Search Space |
| CTF | Charging Trigger Function |
| CTS | Clear-to-Send |
| CW | Codeword |
| CWS | Contention Window Size |
| D2D | Device-to-Device |
| DC | Dual Connectivity, Direct Current |
| DCI | Downlink Control Information |
| DF | Deployment Flavour |
| DL | Downlink |
| DMTF | Distributed Management Task Force |
| DPDK | Data Plane Development Kit |
| DM-RS, DMRS | Demodulation Reference Signal |
| DN | Data network |
| DNN | Data Network Name |
| DNAI | Data Network Access Identifier |
| DRB | Data Radio Bearer |
| DRS | Discovery Reference Signal |
| DRX | Discontinuous Reception |
| DSL | Domain Specific Language. Digital Subscriber Line |
| DSLAM | DSL Access Multiplexer |
| DwPTS | Downlink Pilot Time Slot |
| E-LAN | Ethernet Local Area Network |
| E2E | End-to-End |
| EAS | Edge Application Server |
| ECCA | extended clear channel assessment, extended CCA |
| ECCE | Enhanced Control Channel Element, Enhanced CCE |
| ED | Energy Detection |
| EDGE | Enhanced Datarates for GSM Evolution (GSM Evolution) |
| EAS | Edge Application Server |
| EASID | Edge Application Server Identification |
| ECS | Edge Configuration Server |
| ECSP | Edge Computing Service Provider |
| EDN | Edge Data Network |
| EEC | Edge Enabler Client |
| EECID | Edge Enabler Client Identification |
| EHE | Edge Hosting Environment |
| EGMF | Exposure Governance Management Function |
| EGPRS | Enhanced GPRS |
| EIR | Equipment Identity Register |
| eLAA | enhanced License Assisted Access, enhanced LAA |
| EM | Element Manager |
| eMBB | Enhanced Mobile Broadband |
| EMS | Element Management System |
| eNB | evolved NodeB, E-UTRAN Node B |
| EN-DC | E-UTRA-NR Dual Connectivity |
| EPC | Evolved Packet Core |

-continued

| | |
|---|---|
| EPDCCH | enhanced PDCCH, enhanced Physical Downlink Control Cannel |
| EPRE | Energy per resource element |
| EPS | Evolved Packet System |
| EREG | enhanced REG, enhanced resource element groups |
| ETSI | European Telecommunications Standards Institute |
| ETWS | Earthquake and Tsunami Warning System |
| eUICC | embedded UICC, embedded Universal Integrated Circuit Card |
| E-UTRA | Evolved UTRA |
| E-UTRAN | Evolved UTRAN |
| EV2X | Enhanced V2X |
| F1AP | F1 Application Protocol |
| F1-C | F1 Control plane interface |
| F1-U | F1 User plane interface |
| FACCH | Fast Associated Control CHannel |
| FACCH/F | Fast Associated Control Channel/Full rate |
| FACCH/H | Fast Associated Control Channel/Half rate |
| FACH | Forward Access Channel |
| FAUSCH | Fast Uplink Signalling Channel |
| FB | Functional Block |
| FBI | Feedback Information |
| FCC | Federal Communications Commission |
| FCCH | Frequency Correction CHannel |
| FDD | Frequency Division Duplex |
| FDM | Frequency Division Multiplex |
| FDMA | Frequency Division Multiple Access |
| FE | Front End |
| FEC | Forward Error Correction |
| FFS | For Further Study |
| FFT | Fast Fourier Transformation |
| feLAA | further enhanced Licensed Assisted Access, further enhanced LAA |
| FN | Frame Number |
| FPGA | Field-Programmable Gate Array |
| FR | Frequency Range |
| FQDN | Fully Qualified Domain Name |
| G-RNTI | GERAN Radio Network Temporary Identity |
| GERAN | GSM EDGE RAN, GSM EDGE Radio Access Network |
| GGSN | Gateway GPRS Support Node |
| GLONASS | GLObal'naya NAvigatsionnaya Sputnikovaya Sistema (Engl.: Global Navigation Satellite System) |
| gNB | Next Generation NodeB |
| gNB-CU | gNB-centralized unit, Next Generation NodeB centralized unit |
| gNB-DU | gNB-distributed unit, Next Generation NodeB distributed unit |
| GNSS | Global Navigation Satellite System |
| GPRS | General Packet Radio Service |
| GPSI | Generic Public Subscription Identifier |
| GSM | Global System for Mobile Communications, Groupe Special Mobile |
| GTP | GPRS Tunneling Protocol |
| GTP-UGPRS | Tunnelling Protocol for User Plane |
| GTS | Go To Sleep Signal (related to WUS) |
| GUMMEI | Globally Unique MME Identifier |
| GUTI | Globally Unique Temporary UE Identity |
| HARQ | Hybrid ARQ, Hybrid Automatic Repeat Request |
| HANDO | Handover |
| HFN | HyperFrame Number |
| HHO | Hard Handover |
| HLR | Home Location Register |
| HN | Home Network |
| HO | Handover |
| HPLMN | Home Public Land Mobile Network |
| HSDPA | High Speed Downlink Packet Access |
| HSN | Hopping Sequence Number |
| HSPA | High Speed Packet Access |
| HSS | Home Subscriber Server |
| HSUPA | High Speed Uplink Packet Access |
| HTTP | Hyper Text Transfer Protocol |
| HTTPS | Hyper Text Transfer Protocol Secure (https is http/1.1 over SSL, i.e. port 443) |
| I-Block | Information Block |
| ICCID | Integrated Circuit Card Identification |
| IAB | Integrated Access and Backhaul |
| ICIC | Inter-Cell Interference Coordination |
| ID | Identity, identifier |

-continued

| | |
|---|---|
| IDFT | Inverse Discrete Fourier Transform |
| IE | Information element |
| IBE | In-Band Emission |
| IEEE | Institute of Electrical and Electronics Engineers |
| IEI | Information Element Identifier |
| IEIDL | Information Element Identifier Data Length |
| IETF | Internet Engineering Task Force |
| IF | Infrastructure |
| IIOT | Industrial Internet of Things |
| IM | Interference Measurement, Intermodulation, IP Multimedia |
| IMC | IMS Credentials |
| IMEI | International Mobile Equipment Identity |
| IMGI | International mobile group identity |
| IMPI | IP Multimedia Private Identity |
| IMPU | IP Multimedia Public identity |
| IMS | IP Multimedia Subsystem |
| IMSI | International Mobile Subscriber Identity |
| IoT | Internet of Things |
| IP | Internet Protocol |
| Ipsec | IP Security, Internet Protocol Security |
| IP-CAN | IP-Connectivity Access Network |
| IP-M | IP Multicast |
| IPv4 | Internet Protocol Version 4 |
| IPv6 | Internet Protocol Version 6 |
| IR | Infrared |
| IS | In Sync |
| IRP | Integration Reference Point |
| ISDN | Integrated Services Digital Network |
| ISIM | IM Services Identity Module |
| ISO | International Organisation for Standardisation |
| ISP | Internet Service Provider |
| IWF | Interworking-Function |
| I-WLAN | Interworking WLAN Constraint length of the convolutional code, USIM Individual key |
| kB | Kilobyte (1000 bytes) |
| kbps | kilo-bits per second |
| Kc | Ciphering key |
| Ki | Individual subscriber authentication key |
| KPI | Key Performance Indicator |
| KQI | Key Quality Indicator |
| KSI | Key Set Identifier |
| ksps | kilo-symbols per second |
| KVM | Kernel Virtual Machine |
| L1 | Layer 1 (physical layer) |
| L1-RSRP | Layer 1 reference signal received power |
| L2 | Layer 2 (data link layer) |
| L3 | Layer 3 (network layer) |
| LAA | Licensed Assisted Access |
| LAN | Local Area Network |
| LADN | Local Area Data Network |
| LBT | Listen Before Talk |
| LCM | LifeCycle Management |
| LCR | Low Chip Rate |
| LCS | Location Services |
| LCID | Logical Channel ID |
| LI | Layer Indicator |
| LLC | Logical Link Control, Low Layer Compatibility |
| LMF | Location Management Function |
| LOS | Line of Sight |
| LPLMN | Local PLMN |
| LPP | LTE Positioning Protocol |
| LSB | Least Significant Bit |
| LTE | Long Term Evolution |
| LWA | LTE-WLAN aggregation |
| LWIP | LTE/WLAN Radio Level Integration with IPsec Tunnel |
| LTE | Long Term Evolution |
| M2M | Machine-to-Machine |
| MAC | Medium Access Control (protocol layering context) |
| MAC | Message authentication code (security/encryption context) |
| MAC-A | MAC used for authentication and key agreement (TSG T WG3 context) |
| MAC-IMAC | used for data integrity of signalling messages (TSG T WG3 context) |
| MANO | Management and Orchestration |

-continued

| | |
|---|---|
| MBMS | Multimedia Broadcast and Multicast Service |
| MBSFN | Multimedia Broadcast multicast service Single Frequency Network |
| MCC | Mobile Country Code |
| MCG | Master Cell Group |
| MCOT | Maximum Channel Occupancy Time |
| MCS | Modulation and coding scheme |
| MDAF | Management Data Analytics Function |
| MDAS | Management Data Analytics Service |
| MDT | Minimization of Drive Tests |
| ME | Mobile Equipment |
| MeNB | master eNB |
| MER | Message Error Ratio |
| MGL | Measurement Gap Length |
| MGRP | Measurement Gap Repetition Period |
| MIB | Master Information Block, Management Information Base |
| MIMO | Multiple Input Multiple Output |
| MLC | Mobile Location Centre |
| MM | Mobility Management |
| MME | Mobility Management Entity |
| MN | Master Node |
| MNO | Mobile Network Operator |
| MO | Measurement Object, Mobile Originated |
| MPBCH | MTC Physical Downlink Control CHannel |
| MPDSCH | MTC Physical Downlink Shared CHannel |
| MPRACH | MTC Physical Random Access CHannel |
| MPUSCH | MTC Physical Uplink Shared Channel |
| MPLS | MultiProtocol Label Switching |
| MS | Mobile Station |
| MSB | Most Significant Bit |
| MSC | Mobile Switching Centre |
| MSI | Minimum System Information, MCH Scheduling Information |
| MSID | Mobile Station Identifier |
| MSIN | Mobile Station Identification Number |
| MSISDN | Mobile Subscriber ISDN Number |
| MT | Mobile Terminated, Mobile Termination |
| MTC | Machine-Type Communication |
| mMTC | massive MTC, massive Machine-Type Communications |
| MU-MIMO | Multi User MIMO |
| MWUS | MTC wake-up signal, MTC WUS |
| NACK | Negative Acknowledgement |
| NAI | Network Access Identifier |
| NAS | Non-Access Stratum, Non-Access Stratum layer |
| NCT | Network Connectivity Topology |
| NC-JT | Non-Coherent Joint Transmission |
| NEC | Network Capability Exposure |
| NE-DC | NR-E-UTRA Dual Connectivity |
| NEF | Network Exposure Function |
| NF | Network Function |
| NFP | Network Forwarding Path |
| NFPD | Network Forwarding Path Descriptor |
| NFV | Network Functions Virtualization |
| NFVI | NFV Infrastructure |
| NFVO | NFV Orchestrator |
| NG | Next Generation, Next Gen |
| NGEN-DC | NG-RAN E-UTRA-NR Dual Connectivity |
| NM | Network Manager |
| NMS | Network Management System |
| N-PoP | Network Point of Presence |
| NMIB, N-MIB | Narrowband MIB |
| NPBCH | Narrowband Physical Broadcast CHannel |
| NPDCCH | Narrowband Physical Downlink Control CHannel |
| NPDSCH | Narrowband Physical Downlink Shared CHannel |
| NPRACH | Narrowband Physical Random Access CHannel |
| NPUSCH | Narrowband Physical Uplink Shared CHannel |
| NPSS | Narrowband Primary Synchronization Signal |
| NSSS | Narrowband Secondary Synchronization Signal |
| NR | New Radio, Neighbour Relation |
| NRF | NF Repository Function |
| NRS | Narrowband Reference Signal |
| NS | Network Service |
| NSA | Non-Standalone operation mode |
| NSD | Network Service Descriptor |
| NSR | Network Service Record |
| NSSAI | Network Slice Selection Assistance Information |
| S-NNSAI | Single-NSSAI |

-continued

| | |
|---|---|
| NSSF | Network Slice Selection Function |
| NW | Network |
| NWUS | Narrowband wake-up signal, Narrowband WUS |
| NZP | Non-Zero Power |
| O&M | Operation and Maintenance |
| ODU2 | Optical channel Data Unit - type 2 |
| OFDM | Orthogonal Frequency Division Multiplexing |
| OFDMA | Orthogonal Frequency Division Multiple Access |
| OOB | Out-of-band |
| OOS | Out of Sync |
| OPEX | OPerating EXpense |
| OSI | Other System Information |
| OSS | Operations Support System |
| OTA | over-the-air |
| PAPR | Peak-to-Average Power Ratio |
| PAR | Peak to Average Ratio |
| PBCH | Physical Broadcast Channel |
| PC | Power Control, Personal Computer |
| PCC | Primary Component Carrier, Primary CC |
| P-CSCF | Proxy CSCF |
| PCell | Primary Cell |
| PCI | Physical Cell ID, Physical Cell Identity |
| PCEF | Policy and Charging Enforcement Function |
| PCF | Policy Control Function |
| PCRF | Policy Control and Charging Rules Function |
| PDCP | Packet Data Convergence Protocol, Packet Data Convergence Protocol layer |
| PDCCH | Physical Downlink Control Channel |
| PDCP | Packet Data Convergence Protocol |
| PDN | Packet Data Network, Public Data Network |
| PDSCH | Physical Downlink Shared Channel |
| PDU | Protocol Data Unit |
| PEI | Permanent Equipment Identifiers |
| PFD | Packet Flow Description |
| P-GW | PDN Gateway |
| PHICH | Physical hybrid-ARQ indicator channel |
| PHY | Physical layer |
| PLMN | Public Land Mobile Network |
| PIN | Personal Identification Number |
| PM | Performance Measurement |
| PMI | Precoding Matrix Indicator |
| PNF | Physical Network Function |
| PNFD | Physical Network Function Descriptor |
| PNFR | Physical Network Function Record |
| POC | PTT over Cellular |
| PP, PTP | Point-to-Point |
| PPP | Point-to-Point Protocol |
| PRACH | Physical RACH |
| PRB | Physical resource block |
| PRG | Physical resource block group |
| ProSe | Proximity Services, Proximity-Based Service |
| PRS | Positioning Reference Signal |
| PRR | Packet Reception Radio |
| PS | Packet Services |
| PSBCH | Physical Sidelink Broadcast Channel |
| PSDCH | Physical Sidelink Downlink Channel |
| PSCCH | Physical Sidelink Control Channel |
| PSSCH | Physical Sidelink Shared Channel |
| PSCell | Primary SCell |
| PSS | Primary Synchronization Signal |
| PSTN | Public Switched Telephone Network |
| PT-RS | Phase-tracking reference signal |
| PTT | Push-to-Talk |
| PUCCH | Physical Uplink Control Channel |
| PUSCH | Physical Uplink Shared Channel |
| QAM | Quadrature Amplitude Modulation |
| QCI | QoS class of identifier |
| QCL | Quasi co-location |
| QFI | QoS Flow ID, QoS Flow Identifier |
| QoS | Quality of Service |
| QPSK | Quadrature (Quaternary) Phase Shift Keving |
| QZSS | Quasi-Zenith Satellite System |
| RA-RNTI | Random Access RNTI |
| RAB | Radio Access Bearer, Random Access Burst |
| RACH | Random Access Channel |
| RADIUS | Remote Authentication Dial In User Service |
| RAN | Radio Access Network |
| RAND | RANDom number (used for authentication) |
| RAR | Random Access Response |

-continued

| | |
|---|---|
| RAT | Radio Access Technology |
| RAU | Routing Area Update |
| RB | Resource block, Radio Bearer |
| RBG | Resource block group |
| REG | Resource Element Group |
| Rel | Release |
| REQ | REQuest |
| RF | Radio Frequency |
| RI | Rank Indicator |
| RIV | Resource indicator value |
| RL | Radio Link |
| RLC | Radio Link Control, Radio Link Control layer |
| RLC AM | RLC Acknowledged Mode |
| RLC UM | RLC Unacknowledged Mode |
| RLF | Radio Link Failure |
| RLM | Radio Link Monitoring |
| RLM-RS | Reference Signal for RLM |
| RM | Registration Management |
| RMC | Reference Measurement Channel |
| RMSI | Remaining MSI, Remaining Minimum System Information |
| RN | Relay Node |
| RNC | Radio Network Controller |
| RNL | Radio Network Layer |
| RNTI | Radio Network Temporary Identifier |
| ROHC | RObust Header Compression |
| RRC | Radio Resource Control, Radio Resource Control layer |
| RRM | Radio Resource Management |
| RS | Reference Signal |
| RSRP | Reference Signal Received Power |
| RSRQ | Reference Signal Received Quality |
| RSSI | Received Signal Strength Indicator |
| RSU | Road Side Unit |
| RSTD | Reference Signal Time difference |
| RTP | Real Time Protocol |
| RTS | Ready-To-Send |
| RTT | Round Trip Time |
| Rx | Reception, Receiving, Receiver |
| S1AP | S1 Application Protocol |
| S1-MME | S1 for the control plane |
| S1-U | S1 for the user plane |
| S-CSCF | serving CSCF |
| S-GW | Serving Gateway |
| S-RNTI | SRNC Radio Network Temporary Identity |
| S-TMSI | SAE Temporary Mobile Station Identifier |
| SA | Standalone operation mode |
| SAE | System Architecture Evolution |
| SAP | Service Access Point |
| SAPD | Service Access Point Descriptor |
| SAPI | Service Access Point Identifier |
| SCC | Secondary Component Carrier, Secondary CC |
| SCell | Secondary Cell |
| SCEF | Service Capability Exposure Function |
| SC-FDMA | Single Carrier Frequency Division Multiple Access |
| SCG | Secondary Cell Group |
| SCM | Security Context Management |
| SCS | Subcarrier Spacing |
| SCTP | Stream Control Transmission Protocol |
| SDAP | Service Data Adaptation Protocol, Service Data Adaptation Protocol layer |
| SDL | Supplementary Downlink |
| SDNF | Structured Data Storage Network Function |
| SDP | Session Description Protocol |
| SDSF | Structured Data Storage Function |
| SDT | Small Data Transmission |
| SDU | Service Data Unit |
| SEAF | Security Anchor Function |
| SeNB | secondary eNB |
| SEPP | Security Edge Protection Proxy |
| SFI | Slot format indication |
| SFTD | Space-Frequency Time Diversity, SFN and frame timing difference |
| SFN | System Frame Number |
| SgNB | Secondary gNB |
| SGSN | Serving GPRS Support Node |
| S-GW | Serving Gateway |
| SI | System Information |
| SI-RNTI | System Information RNTI |
| SIB | System Information Block |

-continued

| | |
|---|---|
| SIM | Subscriber Identity Module |
| SIP | Session Initiated Protocol |
| SiP | System in Package |
| SL | Sidelink |
| SLA | Service Level Agreement |
| SM | Session Management |
| SMF | Session Management Function |
| SMS | Short Message Service |
| SMSF | SMS Function |
| SMTC | SSB-based Measurement Timing Configuration |
| SN | Secondary Node, Sequence Number |
| SoC | System on Chip |
| SON | Self-Organizing Network |
| SpCell | Special Cell |
| SP-CSI-RNTI | Semi-Persistent CSI RNTI |
| SPS | Semi-Persistent Scheduling |
| SQN | Sequence number |
| SR | Scheduling Request |
| SRB | Signalling Radio Bearer |
| SRS | Sounding Reference Signal |
| SS | Synchronization Signal |
| SSB | Synchronization Signal Block |
| SSID | Service Set Identifier |
| SS/PBCH | Block |
| SSBRI | SS/PBCH Block Resource Indicator, Synchronization Signal Block Resource Indicator |
| SSC | Session and Service Continuity |
| SS-RSRP | Synchronization Signal based Reference Signal Received Power |
| SS-RSRQ | Synchronization Signal based Reference Signal Received Quality |
| SS-SINR | Synchronization Signal based Signal to Noise and Interference Ratio |
| SSS | Secondary Synchronization Signal |
| SSSG | Search Space Set Group |
| SSSIF | Search Space Set Indicator |
| SST | Slice/Service Types |
| SU-MIMO | Single User MIMO |
| SUL | Supplementary Uplink |
| TA | Timing Advance, Tracking Area |
| TAC | Tracking Area Code |
| TAG | Timing Advance Group |
| TAI | Tracking Area Identity |
| TAU | Tracking Area Update |
| TB | Transport Block |
| TBS | Transport Block Size |
| TBD | To Be Defined |
| TCI | Transmission Configuration Indicator |
| TCP | Transmission Communication Protocol |
| TDD | Time Division Duplex |
| TDM | Time Division Multiplexing |
| TDMA | Time Division Multiple Access |
| TE | Terminal Equipment |
| TEID | Tunnel End Point Identifier |
| TFT | Traffic Flow Template |
| TMSI | Temporary Mobile Subscriber Identity |
| TNL | Transport Network Layer |
| TPC | Transmit Power Control |
| TPMI | Transmitted Precoding Matrix Indicator |
| TR | Technical Report |
| TRP, TRxP | Transmission Reception Point |
| TRS | Tracking Reference Signa |
| TRx | Transceiver |
| TS | Technical Specifications, Technical Standard |
| TTI | Transmission Time Interval |
| Tx | Transmission, Transmitting, Transmitter |
| U-RNTI | UTRAN Radio Network Temporary Identity |
| UART | Universal Asynchronous Receiver and Transmitter |
| UCI | Uplink Control Information |
| UE | User Equipment |
| UDM | Unified Data Management |
| UDP | User Datagram Protocol |
| UDSF | Unstructured Data Storage Network Function |
| UICC | Universal Integrated Circuit Card |
| UL | Uplink |
| UM | Unacknowledge d Mode |
| UML | Unified Modelling Language |
| UMTS | Universal Mobile Telecommunications System |
| UP | User Plane |

-continued

| | |
|---|---|
| UPF | User Plane Function |
| URI | Uniform Resource Identifier |
| URL | Uniform Resource Locator |
| URLLC | Ultra-Reliable and Low Latency |
| USB | Universal Serial Bus |
| USIM | Universal Subscriber Identity Module |
| USS | UE-specific search space |
| UTRA | UMTS Terrestrial Radio Access |
| UTRAN | Universal Terrestrial Radio Access Network |
| UwPTS | Uplink Pilot Time Slot |
| V2I | Vehicle-to-Infrastruction |
| V2P | Vehicle-to-Pedestrian |
| V2V | Vehicle-to-Vehicle |
| V2X | Vehicle-to-everything |
| VIM | Virtualized Infrastructure Manager |
| VL | Virtual Link, |
| VLAN | Virtual LAN, Virtual Local Area Network |
| VM | Virtual Machine |
| VNF | Virtualized Network Function |
| VNFFG | VNF Forwarding Graph |
| VNFFGD | VNF Forwarding Graph Descriptor |
| VNFM VNF | Manager |
| VoIP | Voice-over-IP, Voice-over-Internet Protocol |
| VPLMN | Visited Public Land Mobile Network |
| VPN | Virtual Private Network |
| VRB | Virtual Resource Block |
| WiMAX | Worldwide Interoperability for Microwave Access |
| WLAN | Wireless Local Area Network |
| WMAN | Wireless Metropolitan Area Network |
| WPAN | Wireless Personal Area Network |
| X2-C | X2-Control plane |
| X2-U | X2-User plane |
| XML | eXtensible Markup Language |
| XRES | EXpected user RESponse |
| XOR | exclusive OR |
| ZC | Zadoff-Chu |
| ZP | Zero Power |

Terminology

For the purposes of the present document, the following terms and definitions are applicable to the examples and embodiments discussed herein.

The term "application" may refer to a complete and deployable package, environment to achieve a certain function in an operational environment. The term "AI/ML application" or the like may be an application that contains some AI/ML models and application-level descriptions.

The term "machine learning" or "ML" refers to the use of computer systems implementing algorithms and/or statistical models to perform specific task(s) without using explicit instructions, but instead relying on patterns and inferences. ML algorithms build or estimate mathematical model(s) (referred to as "ML models" or the like) based on sample data (referred to as "training data," "model training information," or the like) in order to make predictions or decisions without being explicitly programmed to perform such tasks. Generally, an ML algorithm is a computer program that learns from experience with respect to some task and some performance measure, and an ML model may be any object or data structure created after an ML algorithm is trained with one or more training datasets. After training, an ML model may be used to make predictions on new datasets. Although the term "ML algorithm" refers to different concepts than the term "ML model," these terms as discussed herein may be used interchangeably for the purposes of the present disclosure.

The term "machine learning model," "ML model," or the like may also refer to ML methods and concepts used by an ML-assisted solution. An "ML-assisted solution" is a solution that addresses a specific use case using ML algorithms during operation. ML models include supervised learning (e.g., linear regression, k-nearest neighbor (KNN), descision tree algorithms, support machine vectors, Bayesian algorithm, ensemble algorithms, etc.) unsupervised learning (e.g., K-means clustering, principle component analysis (PCA), etc.), reinforcement learning (e.g., Q-learning, multi-armed bandit learning, deep RL, etc.), neural networks, and the like. Depending on the implementation a specific ML model could have many sub-models as components and the ML model may train all sub-models together. Separately trained ML models can also be chained together in an ML pipeline during inference. An "ML pipeline" is a set of functionalities, functions, or functional entities specific for an ML-assisted solution; an ML pipeline may include one or several data sources in a data pipeline, a model training pipeline, a model evaluation pipeline, and an actor. The "actor" is an entity that hosts an ML assisted solution using the output of the ML model inference). The term "ML training host" refers to an entity, such as a network function, that hosts the training of the model. The term "ML inference host" refers to an entity, such as a network function, that hosts model during inference mode (which includes both the model execution as well as any online learning if applicable). The ML-host informs the actor about the output of the ML algorithm, and the actor takes a decision for an action (an "action" is performed by an actor as a result of the output of an ML assisted solution). The term "model inference information" refers to information used as an input to the ML model for determining inference(s); the data used to train an ML model and the data used to determine inferences may overlap, however, "training data" and "inference data" refer to different concepts.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. Processing circuitry may include one or more processing cores to execute instructions and one or more memory structures to store program and data information. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. Processing circuitry may include more hardware accelerators, which may be microprocessors, programmable processing devices, or the like. The one or more hardware accelerators may include, for example, computer vision (CV) and/or deep learning (DL) accelerators. The terms "application circuitry" and/or "baseband circuitry" may be considered synonymous to, and may be referred to as, "processor circuitry."

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The terms "instantiate," "instantiation," and the like as used herein refers to the creation of an instance. An "instance" also refers to a concrete occurrence of an object, which may occur, for example, during execution of program code.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or link, and/or the like.

The term "information element" refers to a structural element containing one or more fields. The term "field" refers to individual contents of an information element, or a data element that contains content.

The term "SMTC" refers to an SSB-based measurement timing configuration configured by SSB-MeasurementTimingConfiguration.

The term "SSB" refers to an SS/PBCH block.

The term "a "Primary Cell" refers to the MCG cell, operating on the primary frequency, in which the UE either performs the initial connection establishment procedure or initiates the connection re-establishment procedure.

The term "Primary SCG Cell" refers to the SCG cell in which the UE performs random access when performing the Reconfiguration with Sync procedure for DC operation.

The term "Secondary Cell" refers to a cell providing additional radio resources on top of a Special Cell for a UE configured with CA.

The term "Secondary Cell Group" refers to the subset of serving cells comprising the PSCell and zero or more secondary cells for a UE configured with DC.

The term "Serving Cell" refers to the primary cell for a UE in RRC_CONNECTED not configured with CA/DC there is only one serving cell comprising of the primary cell.

The term "serving cell" or "serving cells" refers to the set of cells comprising the Special Cell(s) and all secondary cells for a UE in RRC_CONNECTED configured with CA/.

The term "Special Cell" refers to the PCell of the MCG or the PSCell of the SCG for DC operation; otherwise, the term "Special Cell" refers to the Pcell.

What is claimed is:

1. An apparatus comprising:

memory to store beamforming configuration information associated with a plurality of multiple-input/multiple-output (MIMO) modes; and processing circuitry, coupled with the memory, to configure the apparatus to:

receive the beamforming configuration information from an open distributed unit (O-DU), the beamforming configuration information comprising at least one beamforming parameter for each of the plurality of MIMO modes, the at least one beamforming parameter selected from beam direction, horizontal beam width, vertical beam width, and beam power gain;

request, from the O-DU based on the beamforming configuration information, measurements associated with the plurality of MIMO modes, the measurements comprising performance metrics associated with spatial distribution of user equipment for each of the plurality of MIMO modes;

receive, from the O-DU, the measurements associated with the plurality of MIMO modes; and based on the received measurements, train an artificial intelligence/machine learning (AI/ML) model that is to predict relative beamforming performance between the plurality of MIMO modes by determining differences in beamforming characteristics between a first MIMO mode of the plurality of MIMO modes and a second MIMO mode of the plurality of MIMO modes.

2. The apparatus of claim 1, wherein the beamforming configuration information includes, for each of the plurality of MIMO modes:

a mode identifier, and at least one operational parameter selected from: an uplink/downlink indicator, a signal-to-noise ratio (SNR) range indicator, a user equipment (UE) mobility indicator, and a computational complexity indicator.

3. The apparatus of claim 1, wherein the processing circuitry is further to configure the apparatus to:

deploy the AI/ML model to a near-real time (near-RT) RIC, and transmit a policy message to the near-RT RIC that configures the near-RT RIC to generate, using the deployed AI/ML model, at least one control message to the O-DU, wherein the at least one control message specifies the at least one beamforming parameter for at least one of the plurality of MIMO modes.

4. The apparatus of claim 1, wherein the measurements associated with the plurality of MIMO modes are a first set of measurements associated with the plurality of MIMO modes and the processing circuitry is further to configure the apparatus to:

receive a second set of measurements associated with the plurality of MIMO modes; and re-train the AI/ML model based on the second set of measurements associated with the plurality of MIMO modes.

5. The apparatus of claim 1, wherein the measurements associated with the plurality of MIMO modes include a throughput measurement, a signal-to-noise ratio (SINR) measurement, or enrichment information.

6. The apparatus of claim 5, wherein the measurements associated with the plurality of MIMO modes include a multiple user MIMO (MU-MIMO)-related identifier, wherein the MU-MIMO-related identifier includes: a UE group identifier, a list of UEs in a group, or an indicator that a UE was part of a MU-MIMO group during a measurement.

7. One or more non-transitory computer-readable media storing instructions that, when executed by one or more processors, cause a non-real time (non-RT) radio access network (RAN) intelligent controller (RIC) to:

request, from an open distributed unit (O-DU), beamforming configuration information associated with a plurality of multiple-input/multiple-output (MIMO) modes, the beamforming configuration information comprising at least one beamforming parameter for each of the plurality of MIMO modes, the at least one beamforming parameter selected from beam direction, horizontal beam width, vertical beam width, and beam power gain;

receive, from the O-DU, the beamforming configuration information;

request, from the O-DU based on the beamforming configuration information, measurements associated with the plurality of MIMO modes, the measurements comprising performance metrics associated with spatial distribution of user equipment for each of the plurality of MIMO modes;

receive, from the O-DU, the measurements associated with the plurality of MIMO modes; and based on the received measurements, train an artificial intelligence/machine learning (AI/ML) model that is to predict relative beamforming performance between the plurality of MIMO modes by determining differences in beamforming characteristics between a first MIMO mode of the plurality of MIMO modes and a second MIMO mode of the plurality of MIMO modes.

8. The one or more non-transitory computer-readable media of claim 7, wherein the beamforming configuration information includes, for each of the plurality of MIMO modes:

a mode identifier, and at least one operational parameter selected from: an uplink/downlink indicator, a signal-to-noise ratio (SNR) range indicator, a user equipment (UE) mobility indicator, and a computational complexity indicator.

9. The one or more non-transitory computer-readable media of claim 7, wherein the media further stores instructions to configure the non-RT RIC to:

deploy the AI/ML model to a near-real time (near-RT) RIC, and transmit a policy message to the near-RT RIC that configures the near-RT RIC to generate, using the deployed AI/ML model, at least one control message to the O-DU, wherein the at least one control message specifies the at least one beamforming parameter for at least one of the plurality of MIMO modes.

10. The one or more non-transitory computer-readable media of claim 7, wherein the measurements associated with the plurality of MIMO modes are a first set of measurements associated with the plurality of MIMO modes and the media further stores instructions to configure the non-RT RIC to:

receive a second set of measurements associated with the plurality of MIMO modes; and re-train the AI/ML model based on the second set of measurements associated with the plurality of MIMO modes.

11. The one or more non-transitory computer-readable media of claim 7, wherein the measurements associated with the plurality of MIMO modes include a throughput measurement, a signal-to-noise ratio (SINR) measurement, or enrichment information.

12. The one or more non-transitory computer-readable media of claim 11, wherein the measurements associated with the plurality of MIMO modes include a multiple user MIMO (MU-MIMO)-related identifier, and wherein the MU-MIMO-related identifier includes: a UE group identifier, a list of UEs in a group, or an indicator that a UE was part of a MU-MIMO group during a measurement.

* * * * *